(12) United States Patent
Swenson

(10) Patent No.: US 9,409,333 B2
(45) Date of Patent: Aug. 9, 2016

(54) METHODS OF MOLDING MULTI-LAYER POLYMERIC ARTICLES HAVING CONTROL OVER THE BREAKTHROUGH OF THE CORE LAYER

(75) Inventor: Paul M. Swenson, South Hamilton, MA (US)

(73) Assignee: Kortec, Inc., Rowley, MA (US)

( * ) Notice: Subject to any disclaimer, the term of this patent is extended or adjusted under 35 U.S.C. 154(b) by 71 days.

(21) Appl. No.: 13/043,230

(22) Filed: Mar. 8, 2011

(65) Prior Publication Data

US 2011/0217496 A1 Sep. 8, 2011

Related U.S. Application Data

(60) Provisional application No. 61/311,704, filed on Mar. 8, 2010.

(51) Int. Cl.
*B29C 45/16* (2006.01)
*B29L 31/00* (2006.01)

(52) U.S. Cl.
CPC ... *B29C 45/1642* (2013.01); *B29C 2945/76545* (2013.01); *B29C 2945/76555* (2013.01);
(Continued)

(58) Field of Classification Search
CPC .................................................. B29C 45/1642
USPC ......................................................... 264/241
See application file for complete search history.

(56) References Cited

U.S. PATENT DOCUMENTS

| 2,418,856 | A | 4/1947 | Stacey |
| 3,339,240 | A | 9/1967 | Corbett |

(Continued)

FOREIGN PATENT DOCUMENTS

| EP | 0311160 A2 | 4/1989 |
| EP | 0419829 A3 | 11/1991 |

(Continued)

OTHER PUBLICATIONS

International Search Report and Written Opinion of the International Searching Authority for International Application No. PCT/US2011/027594, mailed Sep. 20, 2012.

(Continued)

*Primary Examiner* — Larry Thrower
(74) *Attorney, Agent, or Firm* — McCarter & English, LLP; David R. Burns

(57) ABSTRACT

Disclosed herein are methods and systems for co-extruding multiple polymeric material flow streams into a mold cavity to produce a molded plastic article. At least one interior core stream of a first polymeric material is surrounded by inner and outer streams of at least one other polymeric material. The interior core stream serves as an interior layer of a resultant molded plastic article while the inner and outer streams serve as inner and outer layers, respectively, of the resultant plastic article. The interior core stream is selectively directed to flow into or past a downstream branch channel in a mold cavity. The downstream branch channel branches from a primary channel in the mold cavity at a branch junction. The branch channel defines a protrusion portion of the resultant molded plastic article. The leading edge of the interior core stream is selectively controlled in the branch channel to position the leading edge at or near to the terminal end of the branch channel without having the leading edge of the interior core stream breakthrough a flow-front of the inner and outer streams. The resultant molded plastic article includes an interior layer formed of the first polymeric material that extends into, through and to a distal end of the protrusion while still being encased by inner and outer layers formed from the inner and outer flow streams.

17 Claims, 22 Drawing Sheets

(52) U.S. Cl.
CPC .......... *B29C2945/76568* (2013.01); *B29C 2945/76765* (2013.01); *B29K 2995/0069* (2013.01); *B29L 2031/712* (2013.01); *Y10T 428/1352* (2015.01)

(56) References Cited

U.S. PATENT DOCUMENTS

| | | | |
|---|---|---|---|
| 3,679,119 | A | 7/1972 | Copping |
| 3,894,823 | A | 7/1975 | Hanning |
| 3,944,124 | A | 3/1976 | Hexel |
| 4,174,413 | A | 11/1979 | Yasuike et al. |
| 4,554,190 | A | 11/1985 | McHenry et al. |
| 4,568,261 | A | 2/1986 | McHenry et al. |
| 4,751,035 | A * | 6/1988 | McHenry et al. ............ 264/255 |
| 4,946,365 | A | 8/1990 | Kudert et al. |
| 4,990,301 | A | 2/1991 | Krishnakumar et al. |
| 5,433,910 | A | 7/1995 | Mukai et al. |
| 5,914,138 | A | 6/1999 | Swenson |
| 6,180,042 | B1 | 1/2001 | Takeuchi et al. |
| 6,787,097 | B1 | 9/2004 | Homann et al. |
| 6,908,581 | B2 | 6/2005 | Sabin et al. |
| 2002/0192404 | A1 | 12/2002 | Swenson |
| 2003/0124209 | A1 | 7/2003 | Swenson |
| 2004/0265422 | A1 | 12/2004 | Sabin et al. |
| 2009/0152280 | A1 | 6/2009 | Luburic |
| 2009/0285929 | A1 | 11/2009 | Diamantakos et al. |
| 2010/0044916 | A1 | 2/2010 | Richards et al. |
| 2011/0217496 | A1 | 9/2011 | Swenson |

FOREIGN PATENT DOCUMENTS

| | | | |
|---|---|---|---|
| JP | 06190860 A | | 7/1994 |
| JP | 6278164 A | | 10/1994 |
| WO | 02081172 A1 | | 10/2002 |
| WO | 03064133 A1 | | 8/2003 |
| WO | 2005018909 A1 | | 3/2005 |
| WO | 2007006163 A1 | | 1/2007 |
| WO | WO 2007/006163 | * | 1/2007 |
| WO | 2011112613 A1 | | 9/2011 |

OTHER PUBLICATIONS

Eigl, F.A. et al., "Mehr Verstandnis für den Kern," 88:1 Kunststoffe 46-50 (Carl Hanser Verlag, Munich) (Jan. 1, 1998) (German), translated as F.A. Eigl et al., "A Better Understanding of the Core," 88:1 Kunststoffe 14-16 (Jan. 1, 1998).

Naitove, Matthew H., "Multi-Layer Injection Molded Tubs Take on Thermoforming & Metal Cans," Plastics Technology, May 2011, (2 pages), available at http://www.ptonline.com/articles/multi-layer-injection-molded-tubs-take-on-thermoforming-metal-cans.

International Preliminary Report on Patentability for International Application No. PCT/US2011/044222 dated Jan. 22, 2013 (8 pages).

International Preliminary Report on Patentability for International Application No. PCT/US2011/027594, mailed Sep. 20, 2012 (8 pages).

International Search Report and Written Opinion for International Application No. PCT/US2011/062017, dated Feb. 16, 2013 (13 pages).

International Search Report and Written Opinion for International Application No. PCT/US2012/061057, dated Feb. 12, 2013 (17 pages).

International Search Report for International Application No. PCT/US2011/027594, mailed Jun. 28, 2011 (4 pages).

Notification of First Office Action by The State Intellectual Property Office of P.R. China for Chinese Application No. 201180012760.9 dated Jun. 20, 2014 (6 pages).

Notice of Reasons for Rejection by Japanese Patent Authority for Japanese Application No. 2012-557177 dated Jan. 6, 2015 (5 pages).

* cited by examiner

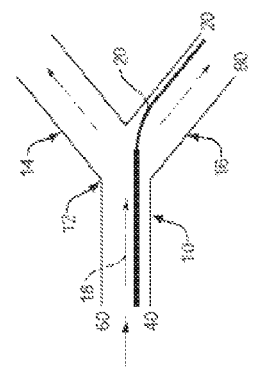
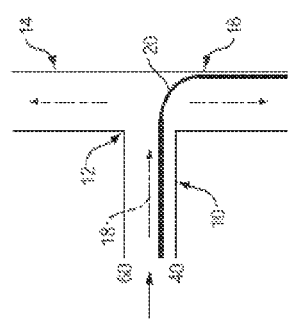
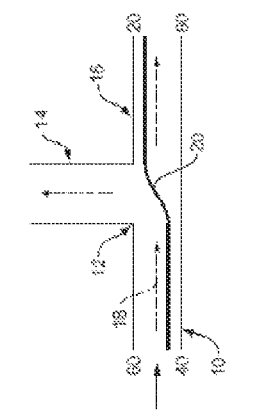
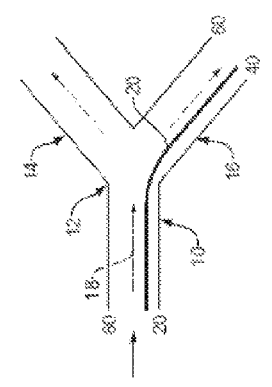
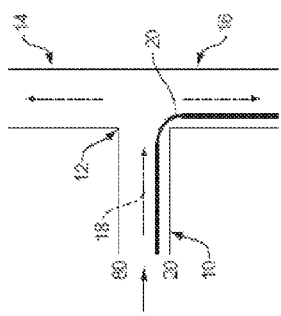
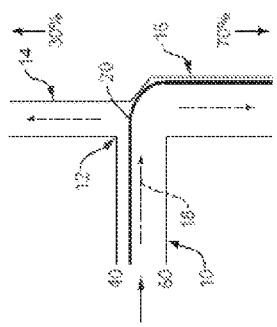
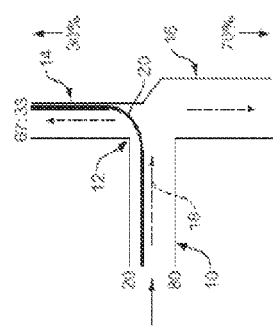
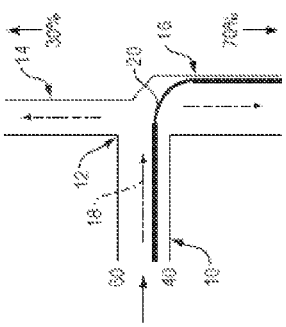

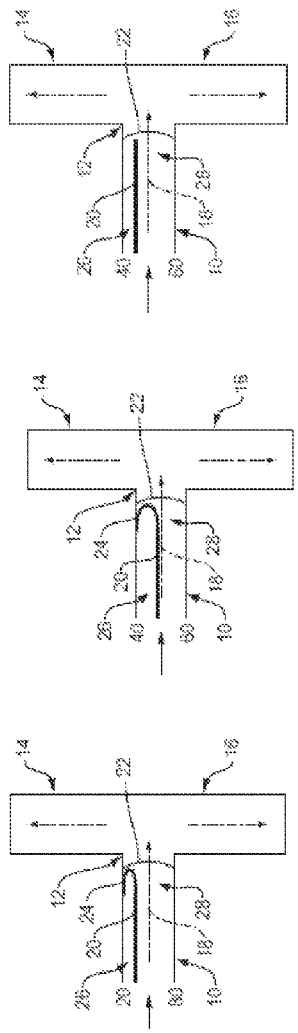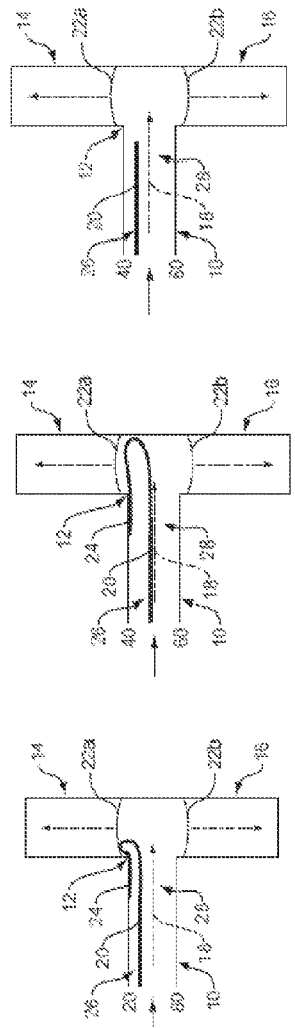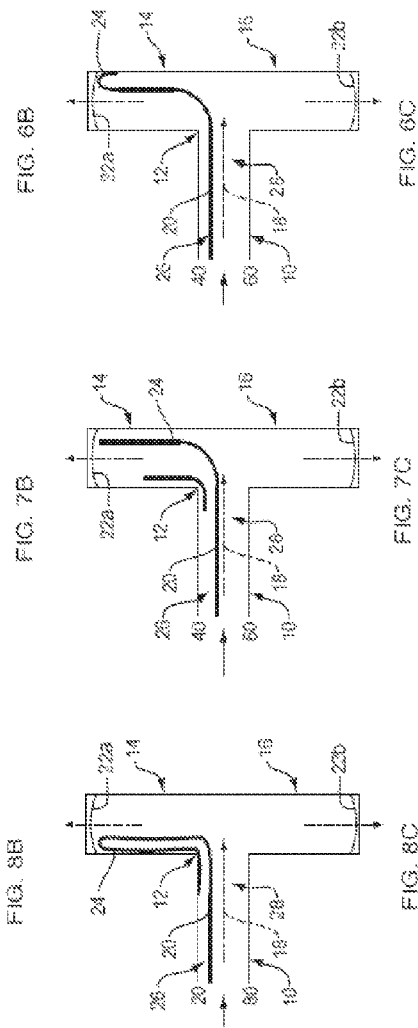

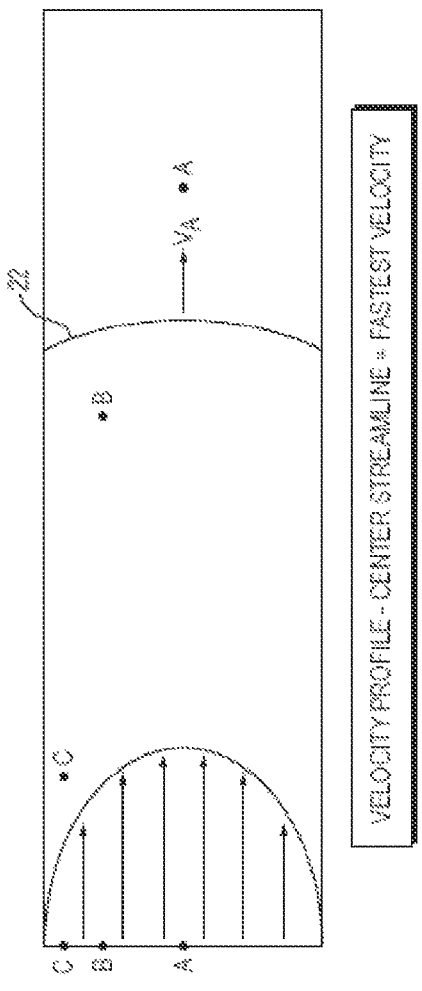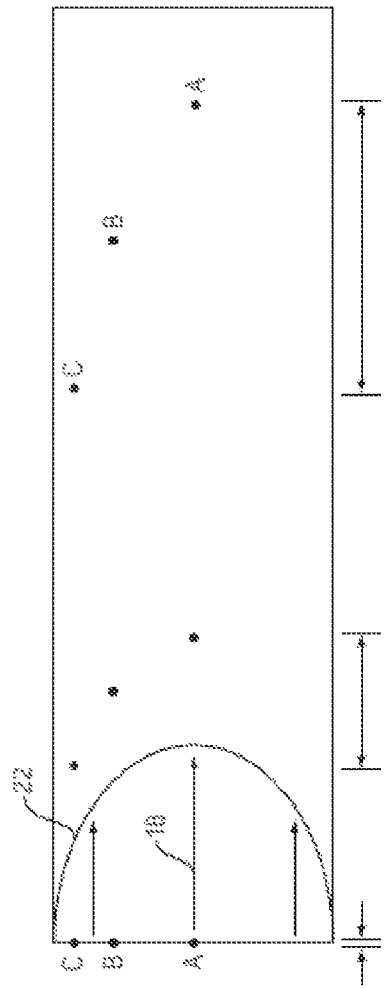
FIG. 11A
FIG. 11B

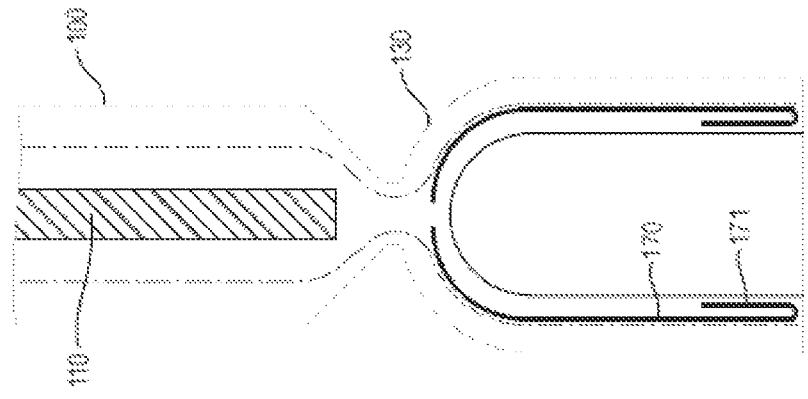
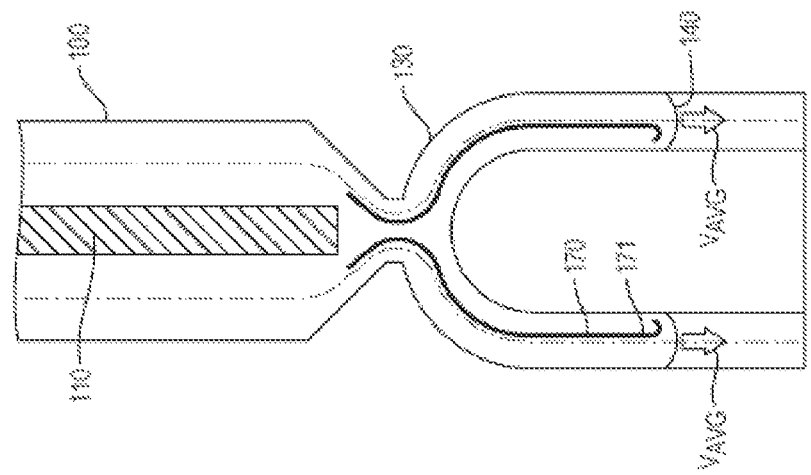
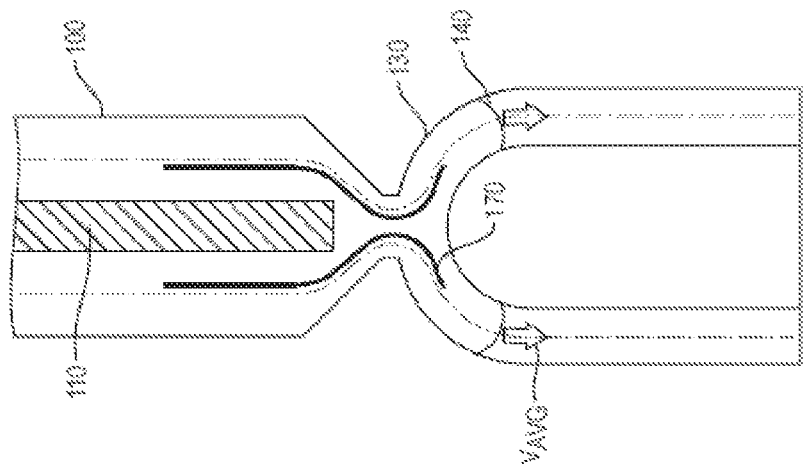

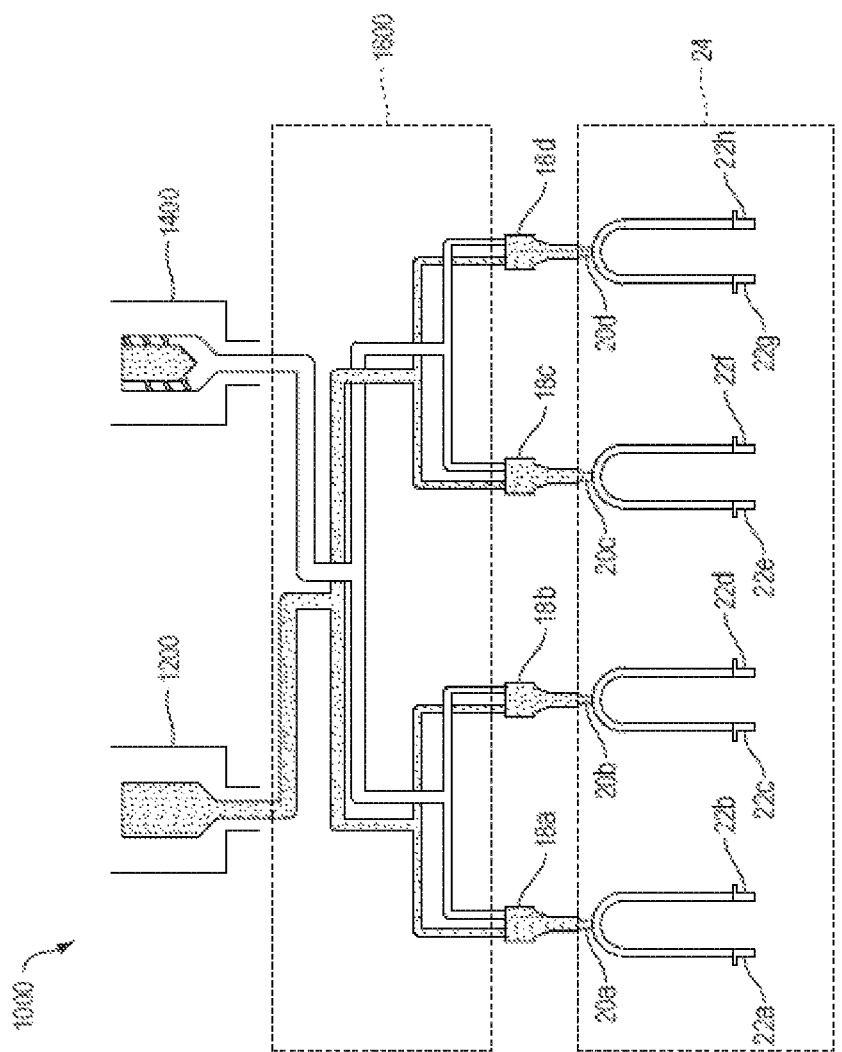

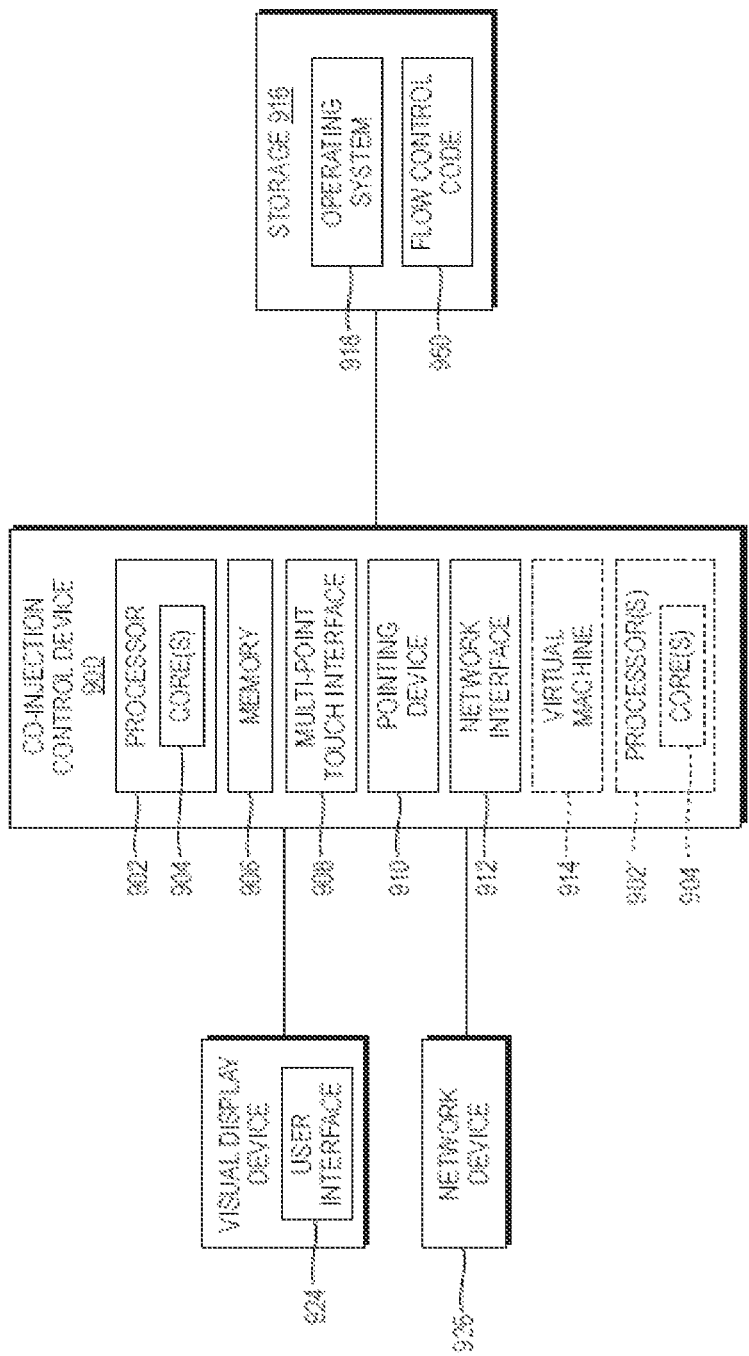

METHODS OF MOLDING MULTI-LAYER POLYMERIC ARTICLES HAVING CONTROL OVER THE BREAKTHROUGH OF THE CORE LAYER

RELATED APPLICATIONS

This application is related to and claims priority to Provisional Application Ser. No. 61/311,704 filed on Mar. 8, 2010, the entire contents of which is hereby incorporated herein by reference in its entirety.

FIELD OF INVENTION

The present invention relates to the co-extrusion of a plurality of flowing polymeric streams in a co-injection molding system for forming multi-layered plastic articles. Combined polymeric streams, which consist of an interior core stream that is encased by inner and outer polymeric streams, are formed in one or more nozzles of the injection system. The combined polymeric streams are used to form plastic articles having an interior core layer that is encased by a skin having an inner layer and an outer layer. The interior core layer is formed from the interior core stream and the inner and outer skin layers are formed from the inner and outer streams, respectively.

More particularly, disclosed herein are methods and systems for forming plastic articles wherein volumetric flow volume of the inner and outer polymeric streams, the position of the interior core stream relative to a velocity flow-front of the combined polymeric stream and extrusion start time of the interior core stream relative to the extrusion start time of the inner and outer polymeric streams are controlled to selectively direct the leading edge of the interior core stream into a downstream branch channel branching from a branch junction in a mold cavity. In accordance with the teachings herein, the interior core stream is advanced as close as possible to the terminal end of the branch channel without allowing the leading edge of the interior core stream to breakthrough the flow-front of the combined stream. Methods and co-injection systems taught herein facilitate the co-injection molding of food or beverage containers whereby breakthrough of the interior core stream is prevented or avoided by controlling the position, timing and volumetric flow rates of the various polymeric flow streams.

BACKGROUND OF INVENTION

Many plastic articles are formed by thermoforming molding processes. These articles include, for example, common containers such as Jell-O® cups, yogurt cups, fruit cups and similar containers having (1) a body portion which has a closed base, side walls coupled to the base and an open terminal end and (2) a protrusion such as a flange portion or lip portion extending radially outward or inward from the side walls. In the art, these containers are commonly produced by thermoforming processes.

Due to the geometries of a mold cavity needed to form a container with a lip, flange or any other type of protrusion, it is difficult to control the downstream flow of the interior core stream and selectively direct the interior core stream into a downstream branch channel branching from a branch junction of a main channel of the mold cavity. It is therefore desirable to have a process for the formation of these flanged articles by co-injection molding whereby the interior core stream can be controlled such that (1) it is selectively directed along a desired pathway in the mold cavity, (2) directed as close to a terminal end of a branch channel that defines a protrusion of the resulting plastic article (3) while simultaneously avoiding the breakthrough of the combined flow-front by the interior core stream.

A further problem experienced when injection molding such articles is that a hole or gap is formed in the interior core layer at the base of the molded article where the interior core layer enters the mold. The hole is formed because the interior core stream is formed by an annular stream with a diameter that decreases towards the base of the molded article. The diameter of the annular core stream at the base of the article corresponds directly to the diameter of the hole or gap. In particular, the interior core layer enters the mold as an annular stream which is surrounded on both sides by inner and outer skin layers. When the flow of the interior core layer is stopped, a tail of the interior core layer continues up the sidewall of the molded part, thereby creating a hole at the base of the molded part which is typically much larger than a gate of the nozzle which injects the interior core and outer layers.

Controlling the size of the hole or gap created by the annular interior core streams is fundamental in present day injection molding systems. If this gap is too large, the barrier properties of the molded part will be significantly reduced. In other words, a vacuum created within a substance-containing portion of the part cannot be maintained for a long period of time because exterior gases will enter the part through the hole, or conversely pressure can not be maintained in the part because gases within the molded part will seep out through the hole. Thus, there is presently a need for a method and apparatus for injection molding articles where the size of a gap or hole in the interior plastic layer is efficiently controlled.

SUMMARY OF THE INVENTION

Methods and systems are herein disclosed for the formation, by co-injection molding, of polymeric plastic articles. The plastic articles include a body portion and a portion protruding from the body portion. The body portion and the portion protruding from the body portion, in some embodiments, both include an interior core layer encapsulated by inner and outer layers. The body portion includes a closed base portion, side walls which can extend in a circumferential manner around the base portion and define an open end opposite the base portion. The protrusion portion extends radially inward or outward from the body portion of the resulting plastic article. The protrusion portion can be symmetric or asymmetric. The body portion and the protrusion portion are formed from a continuous combined polymeric stream having an interior core stream and an inner and outer stream. The resulting plastic articles have an interior core layer in the protrusion portion that is encased by a skin having an inner and outer layer.

The interior core polymeric stream comprises a first polymeric material while the inner and outer streams comprise a second polymeric material. The inner and outer streams are comprised of the same polymeric material(s). The interior core stream is combined with the inner and outer streams in an injection nozzle to form an annular combined flow stream having an annular flow-front. The combined polymeric stream is injected from the nozzle into a gate portion of a mold cavity of the co-injection mold system and flows along a primary annular channel of the mold cavity defining the body portion and branches off at a branching junction into a branch channel defining the protrusion portion of the resulting plastic article. In the resulting plastic article, the interior core layer is formed from the interior core stream and the inner and outer layers of the skin are formed from the inner and outer streams. In some embodiments, the interior core stream is controlled in the nozzle and in the body forming portion of the mold cavity such that the interior core stream flows along a desired and specific flow path and streamline as the combined stream travels from the primary channel into the downstream branch channels. The interior core stream is communicated to the distal portions of the protrusion portion without the interior core stream breaking through the flow-front of the combined stream (inner, interior and outer streams).

As taught herein, the extrusion start time and position of the interior core stream relative to the extrusion start time and volumetric flow ratio of the inner stream to outer stream is controlled such that the interior core stream is communicated into a selected downstream branch channel to a terminal end of the branch channel at a desired position that is substantially adjacent to the flow-front of the combined stream without breaking through the flow-front.

In some embodiments, the interior core stream is combined with the inner and outer streams such that the volumetric flow ratio of the inner stream relative to the flow stream is 50:50 to place the interior core stream on the zero-velocity gradient streamline of the combined velocity profile. In other embodiments, the position of the interior core stream is offset from the zero-velocity gradient streamline such that inner to outer stream ratio is one of 20:80, 25:75, 40:60 such that the interior core stream flows along a streamline of the combined stream that is biased toward the inner stream. In certain other embodiments, the interior core stream is controlled such that it is offset from the zero-velocity gradient streamline of the combined stream such that inner to outer stream ratio is one of 60:40, 75:25 or 80:20 such that the interior core stream flows along a streamline of the combined stream that is biased toward the outer stream.

In some embodiments, the extrusion start time of the interior core stream, relative to the extrusion start time of the inner and outer streams, is controlled. In particular embodiments, the interior core stream extrusion is started at a time $T_1$, $T_2$ or $T_3$ that follows the extrusion start time of the inner and outer streams.

In certain embodiments of the invention, the downstream branch channel defines a flange, or a lip of the resulting plastic article. In certain embodiments of the invention, the downstream branch channel branches from a branching junction with the primary channel at a 45 degree angle or a 90 degree angle or angles therebetween. In certain embodiments of the invention, the downstream branch channel defines a symmetric protrusion that radially circumscribes the resulting plastic article. In certain embodiments of the invention, the downstream branch channel defines an asymmetric protrusion that radially circumscribes the resulting plastic article. In some embodiments, the branch channel radially circumscribes the body portion of the resulting article at the open terminal end or at a position between the open terminal end and the base.

The volumetric flow ratio of the inner and outer streams, the radial position of the interior core stream relative to the zero-velocity gradient streamline of the combined velocity profile and the extrusion start time of the interior core stream relative to the extrusion start time of the inner and outer streams are controlled such that the leading edge of the interior core stream is selectively directed into a downstream branch channel branching from a branch junction and positioned at or near a terminal end of the branch channel without breaking through the flow-front to provide maximum amount of interior core coverage in the protrusion portion of the resulting plastic article.

The present invention also provides a method and apparatus for extruding plastic articles, the method comprising the steps of injecting at least one stream of plastic material into a mold, the mold including a first portion and a second portion, the first portion of said mold being used for forming at least one article, and the second portion of said mold forming a sprue attached to the at least one article, and, terminating the at least one stream of plastic material in the second portion.

BRIEF DESCRIPTION OF THE DRAWINGS

FIGS. 3A, 3B and 3C are cross-sectional views of a combined polymeric stream as it selectively flows from a primary channel, which may be annular, into a desired downstream branch channel as it traverses a branching junction. The downstream branch channel branching from the branching junction at an angle of 45 degrees, 90 degrees and 90 degrees, respectively. The volumetric flow ratio of the inner stream to the outer stream is 60:40 in the primary flow channel and splits at the branching junction into the downstream branch channel wherein the volumetric flow ratio of the inner stream to the outer stream becomes 80:20.

FIGS. 4A, 4B and 4C are cross-sectional views of a combined polymeric stream as it selectively flows from a primary channel, which may be annular, into a desired downstream branch channel as it traverses a branching junction. The downstream branch channel branching from the branching junction at an angle of 45 degrees, 90 degrees and 90 degrees, respectively. The volumetric flow ratio of the inner stream to the outer stream is 80:20 in the primary flow channel and splits at the branching junction into the downstream branch channel wherein the volumetric flow ration of the inner stream to the outer stream becomes 40:60.

FIG. 5A is a cross-sectional view of a combined polymeric stream as it selectively flows from a primary channel, which may be annular, into a desired downstream branch channel as it traverses a branching junction. The downstream branch channels branch from the branching junction at an angle of 90 degrees. One downstream branch channel has a cross-sectional area larger than the cross-sectional area of the other downstream branch channel. The volumetric flow ratio of the inner stream to the outer stream is 40:60 in the primary flow channel and splits at the branching junction into the downstream branch channel with the larger cross-sectional area wherein the volumetric flow ratio of the inner stream to the outer stream becomes 70:10 and seventy percent of the combined polymeric stream flowing into the branch channel with the larger cross-sectional area.

FIG. 5B is a cross-sectional view of a combined polymeric stream as it selectively flows from a primary channel, which may be annular, into a desired downstream branch channel as it traverses a branching junction. The downstream branch channels branch from the branching junction at an angle of 90 degrees. One downstream branch channel has a cross-sectional area larger the than the cross-sectional area of the other downstream branch channel. The volumetric flow ratio of the inner stream to the outer stream is 20:80 in the primary flow channel and splits at the branching junction into the downstream branch channel with the smaller cross-sectional area wherein the volumetric flow ratio of the inner stream to the outer stream becomes 67:33 and thirty percent of the combined polymeric stream flowing into the branch channel with the smaller cross-sectional area.

FIG. 5C is a cross-sectional view of a combined polymeric stream as it selectively flows from a primary channel, which may be annular, into a desired downstream branch channel as it traverses a branching junction. The downstream branch channels branch from the branching junction at an angle of 90 degrees. One downstream branch channel has a cross-sectional area larger the than the cross-sectional area of the other downstream branch channel. The interior core stream is positioned such that the volumetric flow ratio of the inner stream to the outer stream is 60:40 in the primary flow channel and splits at the branching junction into the downstream branch channel with the larger cross-sectional area wherein the volumetric flow ratio of the inner stream to the outer stream becomes 57:43 and seventy percent of the combined polymeric stream flowing into the branch channel with the larger cross-sectional area.

FIGS. 6A, 6B and 6C are cross-sectional views of the leading edge of the interior core, relative to the combined stream, as the combined stream flows along a primary channel and traverses a branching junction and enters the protrusion portion. The interior core stream is positioned such that the ratio of the inner stream to the outer stream is 40:60 in the primary flow channel and splits into the ratio of 80:20 in the downstream branch channel after passing the branching junction, which results in the interior core stream wrapping around on itself towards the outer stream near the flow-front of the combined polymeric stream in the branch channel.

FIGS. 7A, 7B and 7C are cross-sectional views of the leading edge of the interior core, relative to the flow front of the combined polymeric stream, as the combined polymeric stream flows along a primary channel, which may be annular, and traverses a branching junction and enters the downstream branch channel (i.e. the protrusion portion). The volumetric flow ratio of the inner stream to the outer stream is 40:60 in the primary flow channel and splits into the ratio of 80:20 in the selected downstream branch channel after traversing the branching junction.

FIGS. 8A, 8B and 8C are cross-sectional views of the leading edge of the interior core, relative to the flow front of the combined polymeric stream, as the combined polymeric stream flows along a primary channel, which may be annular, and traverses a branching junction and enters the downstream branch channel (i.e., protrusion portion). The volumetric flow ratio of the inner stream to the outer stream is 20:80 in the primary flow channel and splits into the ratio of 40:60 in the downstream branch channel after traversing the branching junction.

FIGS. 11A and 11B are cross-sectional views of the velocity profile of the combined polymeric stream, which may be annular, and the relative velocity differences across the velocity profile of the combined polymeric stream. FIG. 11B illustrates that as the particles move downstream from their initial position, the particles move farther apart.

FIG. 12A provides an exemplary cup-shaped plastic article formed by the methods and systems herein disclosed, wherein the leading edge of the resulting interior core layer is communicated to a position substantially adjacent to the flow-front without breaking through.

FIG. 16B is a cross-sectional view of a co-extrusion molded plastic article having a n-shaped flange wherein the interior core stream has a start time of $T_1$ and is not offset such that the combined radial distance of the resulting inner and outer layers consists of 50% of the outer layer and 50% of the inner layer. The leading edge of the resulting interior core layer breaks through.

FIGS. 26A, 26B and 26C depict cross-sectional views of an exemplary injection molding system suitable for practicing the teachings herein as the combined stream flows along the annular pathways.

FIG. 27 depicts a cross-sectional view of the molding system used in the methods of the present invention.

FIG. 29 illustrates an exemplary computing environment suitable for practicing exemplary embodiments taught herein.

DESCRIPTION

Definitions

Figure 1:
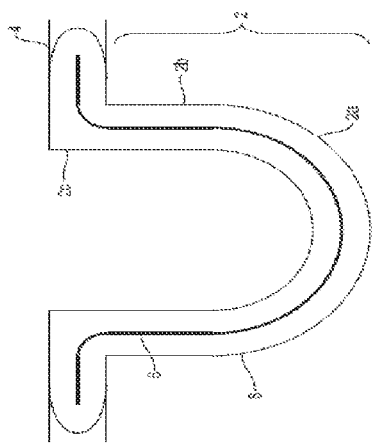
FIG. 1 depicts a cross-sectional view of an exemplary plastic article formed by the methods and systems disclosed herein.

In further describing the exemplary embodiments of the present inventions taught herein, the following definitions are provided to enable further clarity.

As used herein, the terms 20:80, 25:75, 40:60, 50:50, 60:40, 75:25 and 80:20 refer to a volumetric flow ratio of an inner polymeric flow stream to an outer polymeric flow stream, which in turn, controls the position or offset of an interior polymeric flow stream relative to a zero-velocity gradient of a velocity profile of the combined polymeric flow stream core across the flow gradient of the combined polymeric stream as the combined stream flows along the pathways of a nozzle and a mold cavity. With a volumetric flow ratio of 20:80, 25:75 or 40:60, the interior polymeric flow stream is biased towards the inner polymeric flow stream. With a volumetric flow ratio of 60:40, 75:25 or 80:20 the interior polymeric flow stream is biased towards the outer polymeric flow stream. With a volumetric flow ratio of 50:50 the interior polymeric flow stream is not biased to either the inner or outer streams but instead flows along the zero-gradient of the velocity profile of the combined polymeric stream.

As used herein, the term "release time" is used interchangeably with the term "extrusion start time" unless otherwise distinguished. Release times include $T_1$, $T_2$ and $T_3$ wherein $T_1$ represents substantially simultaneous release of the interior core stream and the flow front of the combined polymeric stream. $T_2$ represents a release time that is subsequent to the release time of the flow front of the combined polymeric stream. $T_3$ is a release time subsequent to $T_2$.

Description

The present invention teaches methods and systems for the manufacture of molded plastic articles having a body portion and a protrusion portion extending radially and/or axially therefrom and an interior layer having a leading edge positioned at or near a terminal portion of the protrusion portion. The interior layer is encased in an inner layer and an outer layer of polymer. The protrusion portion is defined by a downstream branch channel in a mold cavity that branches from a primary channel at a branching junction. The protrusion portion can protrude radially inward, outward or both from the body portion and can extend circumferentially about the body portion. The protrusion portion can have a symmetric shape or an asymmetric shape. The protrusion portion can be a flange, a lip, a wall or any other element that protrudes or extends from the body portion of the resulting plastic article.

The body portion and protrusion portion of the resulting plastic article are formed from the co-extrusion of a combined polymeric stream into a mold cavity having a primary channel defining the body portion and a branch channel branch defining the protrusion portion. The branch channel branches from the primary channel at a branching junction located downstream from a gate portion of the mold cavity.

As taught herein, a combined polymeric stream is formed as a polymeric stream that includes an interior core stream of a first polymeric material that is encased by an inner and outer polymeric stream of a second polymeric material. The interior core stream is combined with the inner and outer streams in a nozzle used for injecting the combined stream into the mold cavity through the gate portion. The interior core stream forms the core layer in the resulting molded plastic article. The inner and outer streams form the skin that encases the core layer of the resulting plastic article.

As taught herein, exemplary methods and systems control the inner to outer layer volumetric flow ratio in a nozzle and a mold cavity and control the extrusion start time of the interior core stream relative to the extrusion start time of the inner and outer streams to selectively direct the interior core stream into or past a branch channel in the mold cavity located downstream from a primary channel of the mold cavity. The branch channel branches from the primary channel at a branch junction, downstream from a gate portion, of the mold cavity. The control of the inner to outer volumetric flow ratio in the nozzle and the mold cavity and the control of the extrusion start time of the interior core stream relative to the extrusion start time of the inner and outer streams controls the position of the leading edge of the interior core stream as it flows into and out of the branch junction and controls the placement of the leading edge of the interior core stream at or near a terminal portion of the branch channel without breaking through the flow-front. In some embodiments, the interior core stream can be selectively directed into a downstream branch channel at a branching junction and a leading edge of the interior core stream can be selectively placed at or near a terminal end of the selected downstream channel without breaking through the flow-front of the combined polymeric stream (inner, outer and interior core streams). In some embodiments, the interior core stream can be selectively directed past a downstream branch channel at a branching junction and a leading edge of the interior core stream can be selectively placed at or near a terminal end of the primary channel without breaking through the flow-front of the combined polymeric stream (the inner, outer and interior core streams).

For ease of discussion, FIGS. 1A-5C exemplarily depict control of the volumetric flow ration of the inner and outer streams to selectively direct the interior core stream into or past a branch channel branching from a downstream branch junction.

FIGS. 6A-8C exemplarily depict various start times for extruding an interior core stream relative to the start time for extruding the inner and outer streams.

FIGS. 12-24B exemplarily depict the combined effects of controlling the inner to outer volumetric flow ratio and start times for extruding an interior core stream relative to start time for extruding the inner and outer streams.

In some embodiments, the methods and systems of the present invention produces polymeric plastic articles as depicted in FIG. 1, by co-injection molding. The plastic articles having (1) a body portion 2 that includes a closed base 2A, side wall or walls 2B and an open end 2C and (2) a protrusion portion 4 that protrudes from the body portion 2. In some embodiments the protrusion portion 4 protrudes inwardly into the receptacle formed by the side walls 2B and the closed base 2A. In some embodiments the protrusion portion 4 protrudes outwardly away from the receptacle formed by the side walls 2B and the closed base 2A. In some embodiments the protrusion portion 4 protrudes inwardly into the receptacle formed by the side walls 2B and the closed base 2A and protrudes outwardly away from the receptacle formed by the side walls 2B and the closed base 2A.

The protrusion portion 4 extends circumferentially about the body portion 2 at any desired location. For example, the protrusion portion 4 can extend circumferentially at or near the open end 2C or at a desired position between the open end 2C and the closed base 2A. In certain embodiments, the articles are, for example, cylindrical or cup shaped articles having a body portion with a base and side wall or walls that extend to an open end and together define a receptacle for holding a liquid, a solid, a gas or any combination thereof. The base may be of even width or area as the open end of the article or may be larger or smaller width or area as the open end. The protrusion portion 4 is defined by a branch channel that branches from a branching junction located at a primary channel in a mold cavity. The protrusion portion 4 can take the form of a flange, a lip, an additional wall or any other protrusion which extends from the body portion 2 inwardly or outwardly or both. As taught herein, the interior core stream can be selectively directed into the branch channel and the leading edge of the interior core stream placed at or near the terminal end of the branch channel without breaking through the skin formed by the inner and outer streams. The flange is formed as a molded feature which is part of the plastic article and is formed from a continuous flow of the combined stream that also forms the body portion.

Figure 23A:
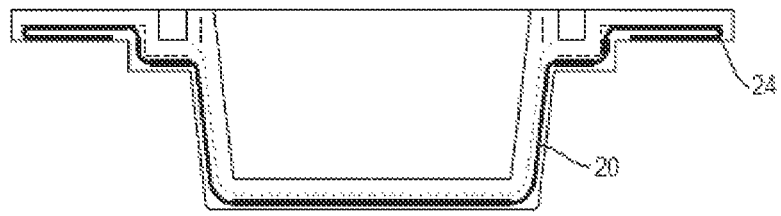
FIG. 23A is a cross-sectional view of a co-extrusion molded plastic article having an extended u-shaped non-symmetrical flange wherein the interior core stream is offset such that the combined radial distance of the resulting inner and outer layers consists of 20% of the outer layer and 80% of the inner layer. The length of the wrap portion on the left side relative to the right side is proportional to the length of the down stream branch channel of the left side versus the right side.

In some exemplary embodiments the protrusion portion 4 can take a number of shapes including, but not limited to straight (FIG. 12A), n-shaped (FIG. 16A), T-shaped (FIG. 19A) or u-shaped (FIG. 23A).

In some embodiments, the inner and outer streams are the same or different polymeric materials. For example, in some embodiments, the inner and outer skin layers are Polyethylene Teraphalate (PET) or Polypropylene (PP) while the interior core layer is formed from a material chosen to enhance the overall performance of the resulting article, or to reduce the cost of the resulting article. For example, interior layers may include one or more layers of a barrier material (MXD6 Nylon or EVOH), oxygen scavenging material, recycled material, or other performance-enhancing or cost-reducing material. The type of material used for the interior layer/stream is often different from the type of material used for the inner and outer layers/streams.

FIGS. 1A-9C depict exemplary embodiments of a primary channel, a branch channel and a branching junction. The branch channel may branch from the primary channel at the branching junction at various angles.

Figure 1A:
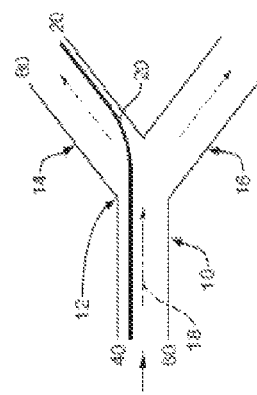
FIGS. 1A, 1B and 1C are cross-sectional views of a combined polymeric stream as it selectively flows from a primary annular channel into a desired downstream branch channel as it traverses a branching junction. The downstream branch channel branching from the branching junction at an angle of 45 degrees, 90 degrees and 90 degrees, respectively. The volumetric flow ratio of the inner stream to the outer stream is 40:60 in the primary flow channel and splits at the branching junction into the downstream branch channel wherein the volumetric flow ratio of the inner stream to the outer stream becomes 80:20.
Figure 1B:
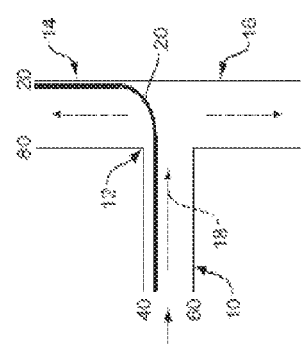
Figure 1C:
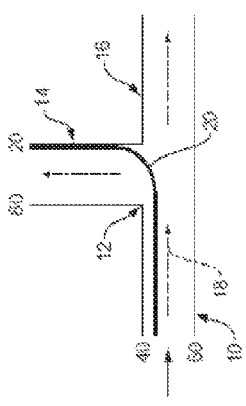

FIGS. 1A, 1B and 1C, for example, depict a primary channel 10 and a branching junction 12 and a downstream branch channel 14 that branches from the branching junction 12 at angles of 45 degrees, 90 degrees, and 90 degrees, respectively. FIGS. 1A and 1B include a second branch channel 16 that branches from the branching junction 12 at angles of 45 degrees and 90 degrees, respectively. In FIGS. 1A and 1B the primary channel 10 terminates at the branching junction 12. In FIG. 1C the primary channel continues through the branching junction 12. Where it is desirable to have the interior core stream flow into the branch channel 14 offset towards the inner stream, the upstream volumetric flow ratio in the primary channel 10 is controlled to be 40:60, which results in an 80:20 inner to outer volumetric flow ratio in the downstream branch channel 14.

Figure 2A:
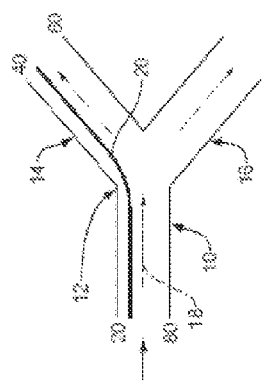
FIGS. 2A, 2B and 2C are cross-sectional views of a combined polymeric stream as it selectively flows from a primary annular channel into a desired downstream branch channel as it traverses a branching junction. The downstream branch channel branching from the branching junction at an angle of 45 degrees, 90 degrees and 90 degrees, respectively. The volumetric flow ratio of the inner stream to the outer stream is 20:80 in the primary flow channel and splits at the branching junction into the downstream branch channel wherein the volumetric flow ratio of the inner stream to the outer stream becomes 40:60.
Figure 2B:
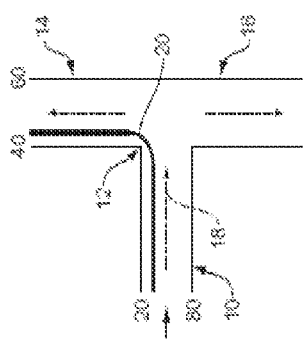
Figure 2C:
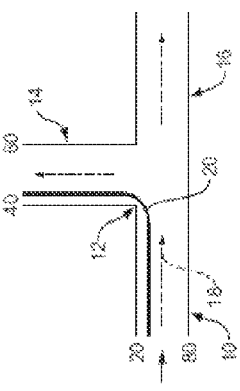

FIGS. 2A, 2B and 2C, for example, depict a primary channel 10 and a branching junction 12 and a downstream branch channel 14 that branches from the branching junction at angles of 45 degrees, 90 degrees, and 90 degrees, respectively. FIGS. 2A and 2B include a second branch channel 16 that branches from the branching junction at angles of 45 degrees and 90 degrees, respectively. In FIGS. 2A and 2B the primary channel 10 terminates at the branching junction 12. In FIG. 2C the primary channel continues through the branching junction 12. Where it is desirable to have the interior core stream flow into the branch channel 14 offset towards the outer stream, the upstream volumetric flow ratio in the primary channel 10 is controlled to be 20:80, which results in a 40:60 inner to outer volumetric flow ratio in the downstream branch channel 14.

FIGS. 3A, 3B and 3C, for example, depict a primary channel 10 and a branching junction 12 and a downstream branch channel 14 that branches from the branching junction 12 at angles of 45 degrees, 90 degrees, and 90 degrees, respectively. FIGS. 3A and 3B include a second branch channel 16 that branches from the branching junction at angles of 45 degrees and 90 degrees, respectively. In FIGS. 3A and 3B the primary channel 10 terminates at the branching junction 12. In FIG. 3C the primary channel continues through the branching junction 12. Where it is desirable to have the interior core stream core flow into the branch channel 16 offset towards the outer stream, the upstream volumetric flow ratio in the primary channel 10 is controlled to be 60:40, which results in an 80:20 inner to outer volumetric flow ratio in the downstream branch channel 16. Where it is desirable to have the interior core stream flow through the branching junction 12 into a downstream portion of the primary channel 10, the upstream volumetric flow ratio in the primary channel 10 is controlled to be 60:40, which results in the interior core stream shifting towards the inner stream in the branching junction 12.

FIGS. 4A, 4B and 4C, for example, depict a primary channel 10 and a branching junction 12 and a downstream branch channel 14 that branches from the branching junction at angles of 45 degrees, 90 degrees, and 90 degrees, respectively. FIGS. 4A and 4B include a second branch channel 16 that branches from the branching junction at angles of 45 degrees and 90 degrees, respectively. In FIGS. 4A and 4B the primary channel 10 terminates at the branching junction 12. In FIG. 4C the primary channel continues through the branching junction 12. Where it is desirable to have the interior core stream flow into the branch channel 16 offset towards the inner stream, the upstream volumetric flow ratio in the primary channel 10 is controlled to be 80:20, which results in an 40:60 inner to outer volumetric flow ratio in the downstream branch channel 16. Where it is desirable to have the interior core stream flow through the branching junction 12 into a downstream portion of the primary channel 10, the upstream volumetric flow ratio in the primary channel 10 is controlled to be 80:20, which results in the interior core stream shifting towards the zero velocity gradient of the flow-front of the combined flow stream in the branching junction 12.

The present invention also contemplates and includes embodiments wherein the downstream annular pathways are of different sizes from each other and from the upstream annular pathway, as depicted in FIGS. 5A-5C.

FIGS. 5A, 5B and 5C, for example, depict a primary channel 10, a branching junction 12, a downstream branch channel 14 that branches from the branching junction 12 at an angle of 90 degrees, and a downstream branch channel 16 that branches from the branching junction 12 at an angle of 90 degrees. The downstream branch channel 16 has a cross-sectional area larger that the cross-sectional area of the branch channel 14. In FIGS. 5A, 5B and 5C the primary channel 10 terminates at the branching junction 12.

In FIG. 5A, it is desirable to have a larger overall volume of polymeric material and the interior core stream flow into the branch channel 16, the upstream volumetric flow ratio in the primary channel 10 is controlled to be 40:60, which results in an 86:14 inner to outer volumetric flow ratio in the downstream branch channel 16 and the interior core stream offset towards the outer flow. In FIG. 5A 30% of the total volume of the combined polymeric stream flows into branch channel 14 and 70% of the volume of the combined polymeric stream flows into branch channel 16.

In FIG. 5B, it is desirable to have a larger overall volume of polymeric material flow into the branch channel 16 and the interior core stream flow into the branch channel 14, the upstream volumetric flow ratio in the primary channel 10 is controlled to be 20:80, which results in an 67:33 inner to outer volumetric flow ratio in the downstream branch channel 14 and the interior core stream offset towards the inner flow in the branch channel 14. In FIG. 5B 30% of the total polymeric volume flows into branch channel 14 and 70% of the total polymeric volume flows into branch channel 16.

In FIG. 5C, it is desirable to have a larger overall volume of polymeric material flow into the branch channel 16 and the interior core stream flow into the branch channel 16, the upstream volumetric flow ratio in the primary channel 10 is controlled to be 60:40, which results in an 57:43 inner to outer volumetric flow ratio in the downstream branch channel 16 and the interior core stream offset towards the outer flow in the branch channel 16. In FIG. 5C 30% of the total polymeric volume flows into branch channel 14 and 70% of the total polymeric volume flows into branch channel 16.

The present invention also contemplates and includes embodiments wherein the interior core stream 20 is adjusted to start flowing at various times (T) relative to the start time for the flow front 22, as depicted in FIGS. 6A-8C. As depicted in FIGS. 6A to 8C, when the start time of the interior core stream 20 is close to the start time of the flow of the flow front 22, the interior core stream 20 wraps around onto itself with greater magnitude.

FIGS. 6A, 6B and 6C are temporal depictions of cross-sectional views of the leading edge 24 of the interior core stream 20 at times $t_1$, $t_2$ and $t_3$, respectively. FIGS. 6A, 6B and 6C depict the interior core stream 20 and the leading edge 24, relative to the flow front 22, as the flow front 22 flows along a primary channel 10 and traverses a branching junction 12 and enters downstream branch channels 14, 16. The interior core stream 20 flows along the primary flow channel 10 such that the ratio of the inner stream 26 to the outer stream 28 is 40:60 in the primary flow channel 10 and splits into the ratio of 80:20 in the downstream branch channel 14 after passing the branching junction 12, which results in the interior core stream 20 that wraps around on itself towards the outer layer 28 near the flow-front 22 in the branch channel. FIG. 6A depicts interior core stream 20 in primary channel 10 as it is released subsequent to the flow front 22. As depicted in FIG. 6B, when flow fronts 22A and 22B are already in channels 14 and 15, the leading edge 24 is still in branching junction 12. FIG. 6C demonstrates that as the flow fronts 22A and 22B travel to the distal portions of channels 14 and 16, the leading edge 24 catches up to the flow fronts 22A, 22B and wraps around onto itself.

FIGS. 7A, 7B and 7C are temporal depictions of cross-sectional views of the leading edge 24 of the interior core stream 20 at times $t_1$, $t_2$ and $t_3$, respectively where the starting time of the interior core stream 20 is closer to the starting time of the flow front 22 than in FIGS. 6A, 6B and 6C. FIGS. 7A, 7B and 7C depict the interior core stream 20 and the leading edge 24, relative to the flow front 22, as the flow front 22 flows along a primary channel 10 and traverses a branching junction 12 and enters downstream branch channels 14, 16. The interior core stream 20 flows along the primary flow channel 10 such that the ratio of the inner stream 26 to the outer stream 28 is 40:60 in the primary flow channel 10 and splits into the ratio of 80:20 in the downstream branch channel 14 after passing the branching junction 12, which results in the interior core stream 20 that wraps around on itself towards the outer layer 28 near the flow-front 22 in the branch channel. FIG. 7A depicts interior core stream 20 in primary channel 10 as it is released close to the start time of the flow front 22 such that the leading edge 24 catches up to the flow front 22 and wraps around onto itself while still in primary channel 10. As depicted in FIG. 7B, when flow fronts 22A and 22B begin to enter channels 14 and 15, the leading edge 24 is already substantially wrapped around onto itself in branching junction 12. FIG. 7C demonstrates that as the flow fronts 22A and 22B travel to the distal portions of channels 14 and 16, the leading edge 24 breaks and wraps around onto itself as in FIG. 6C.

FIGS. 8A, 8B and 8C are temporal depictions of cross-sectional views of the leading edge 24 of the interior core stream 20 at times t1, t2 and t3, respectively, where the starting time of the interior core stream 20 is as depicted in FIGS. 7A, 7B and 7C. The ratio of inner layer 26 to outer layer 28 is adjusted to be 20:80. FIGS. 8A, 8B and 8C depict the interior core stream 20 and the leading edge 24, relative to the flow front 22, as the flow front 22 flows along a primary channel 10 and traverses a branching junction 12 and enters downstream branch channels 14, 16. The interior core stream 20 flows along a streamline in the primary flow channel 10 such that the ratio of the inner stream 26 to the outer stream 28 is 20:80 in the primary flow channel 10 and splits into the ratio of 40:60 in the downstream branch channel 14 after passing the branching junction 12, which results in the interior core stream 20 that wraps around on itself towards the outer layer 28 near the flow-front 22 in the branch channel. FIG. 8A depicts interior core stream 20 in primary channel 10 as it is released close to the start time of the flow front 22 such that the leading edge 24 catches up to the flow front 22 and wraps around onto itself while still in primary channel 10. As depicted in FIG. 7B, when flow fronts 22A and 22B begin to enter channels 14 and 15, the leading edge 24 is already substantially wrapped around onto itself in branching junction 12. FIG. 7C demonstrates that as the flow fronts 22A and 22B travel to the distal portions of channels 14 and 16, the leading edge 24 continues to wrap around onto itself with greater magnitude than in FIG. 6C.

It may be desirable, and is provided in certain embodiments herein, for the interior core stream to travel along the zero-velocity gradient streamline as it is communicated along the protrusion portion.

Figure 9A:
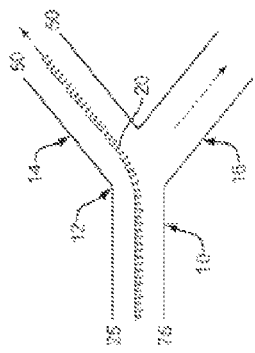
FIGS. 9A, 9B and 9C are cross-sectional views of a combined polymeric stream as it selectively flows from a primary channel, which may be annular, into a desired downstream branch channel as it traverses a branching junction. The downstream branch channel branching from the branching junction at an angle of 45 degrees, 90 degrees and 90 degrees, respectively. The volumetric flow ratio of the inner stream to the outer stream is 25:75 in the primary flow channel and splits at the branching junction into the downstream branch channel wherein the volumetric flow ratio of the inner stream to the outer stream becomes 50:50.
Figure 9B:
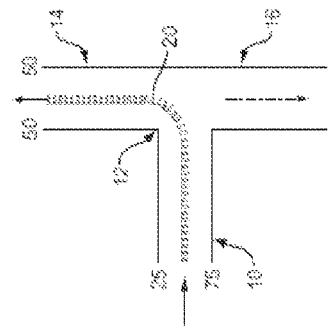
Figure 9C:
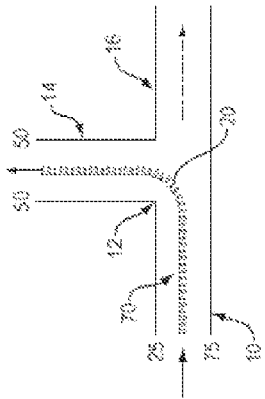

FIGS. 9A, 9B and 9C, for example, depict a primary channel 10 and a branching junction 12 and a downstream branch channel 14 that branches from the branching junction 12 at angles of 45 degrees, 90 degrees, and 90 degrees, respectively. FIGS. 9A and 9B include a second branch channel 16 that branches from the branching junction 12 at angles of 45 degrees and 90 degrees, respectively. In FIGS. 9A and 9B the primary channel 10 terminates at the branching junction 12. In FIG. 9C the primary channel continues through the branching junction 12. Where it is desirable to have the interior core stream flow into the branch channel 14 on the zero velocity gradient 18 of the flow-front of the combined polymeric stream, the upstream volumetric flow ratio in the primary channel 10 is controlled to be 25:75, which results in a 50:50 volumetric ratio of inner stream to the outer stream in the downstream branch channel 14.

Figure 10:
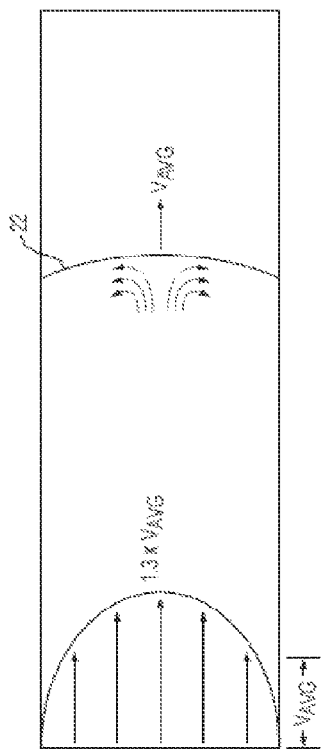
FIG. 10 is a cross-sectional view of the fountain flow effect of a combined polymeric stream as it flows along an annular pathway of a mold cavity.

FIG. 10 depicts the fountain flow effects whereby flow-front 22 has a velocity gradient such that the volumetric flow rate is fastest in the middle and slowest at or near the interface of the combined polymeric stream and the walls of the channels of the mold cavity.

FIGS. 11A and 11B depicts the velocity gradient, where the combined stream is fastest at point "A" and slowest at point "C". The zero-velocity gradient occurs at the point where the velocity of the flow is greatest. Because the flow at the zero-velocity gradient streamline is greater than the average velocity of the flow-front, the interior material injected at the zero velocity gradient point can, under some circumstances "catch up" to and pass the flow-front and break through the skin, even if injection of the interior material begins after injection of the inner and outer layers (PET or PP). The leading edge of the interior core stream material will breakthrough when the interior material reaches the flow-front near the zero-velocity gradient.

Figure 11C:
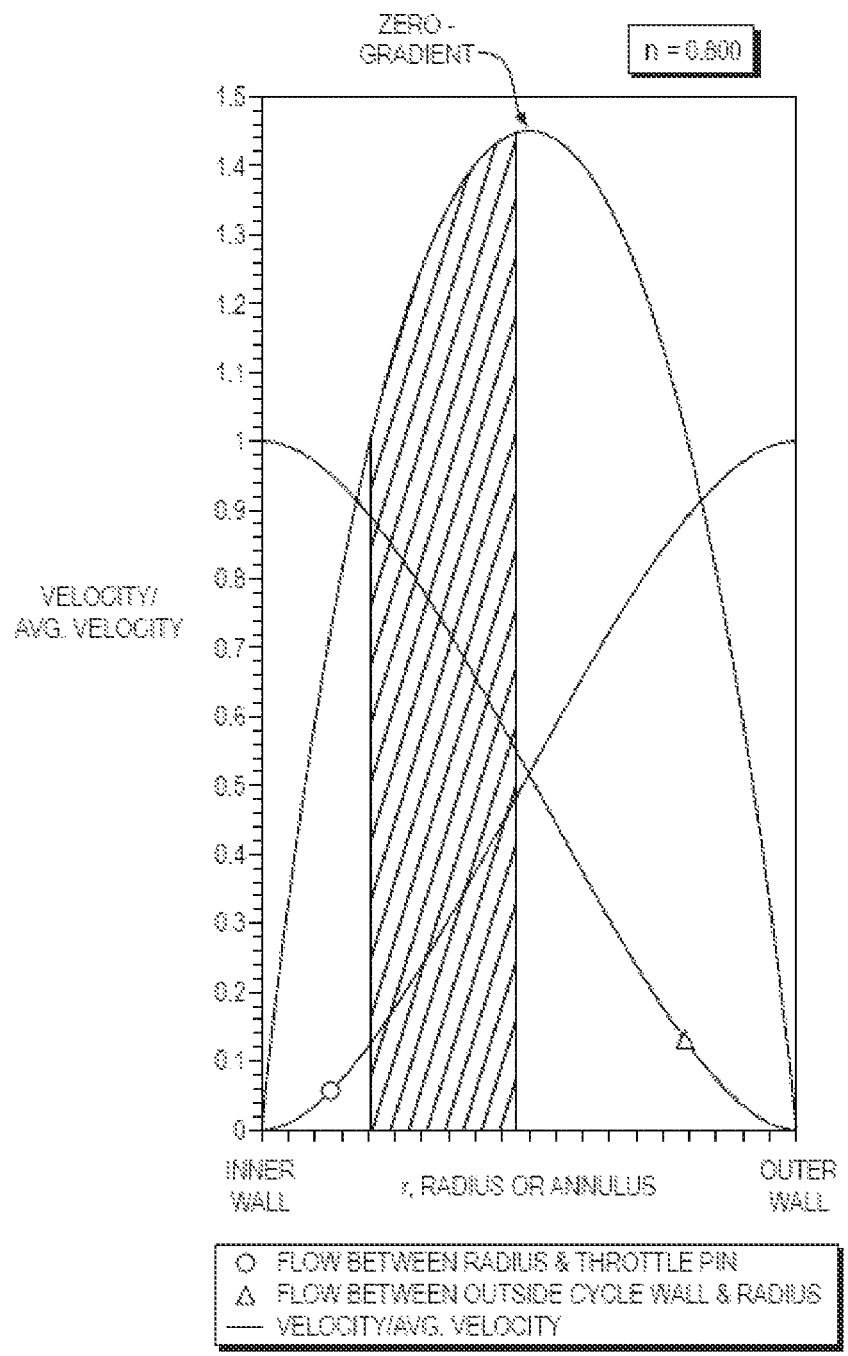
FIG. 11C is a graph illustrating resulting flow fraction and velocity profile curves across the annular channel within a nozzle such as in FIG. 28. The ordinate plotting the ratio of flow velocity-to-average velocity as a function of the radius of the annulus between the inner and outer nozzle wall, with the central solid line curve plotting said ratio and showing zero gradient for the combined polymeric stream, and the curve designated with a circle marker, plotting the flow of the inner stream between the radius and the throttle pin from the inner to the outer wall, and the curve marked with a triangle, plotting the flow of the outer stream between the outer wall and the annular radius. The shaded area illustrates the region where the interior core stream folds over toward the inner wall.

FIG. 11C depicts the normalized velocity profile and volume fraction inside and outside for a fluid with n=0.8 (where n is the parameter for the non-Newtonian power law model of fluid flow). The hatched area shows the acceptable location for interior layer placement that is both greater than the average velocity and off the zero velocity gradient. This area will wrap the layer to the inside of the part. From the graph we can see that the flow fraction of the inside layer can be in a range from 0.1 to 0.45. The flow fraction of the outside layer can be from 0.9 to 0.55. The interior layer thickness can be as thick as 0.45.

Figure 26:
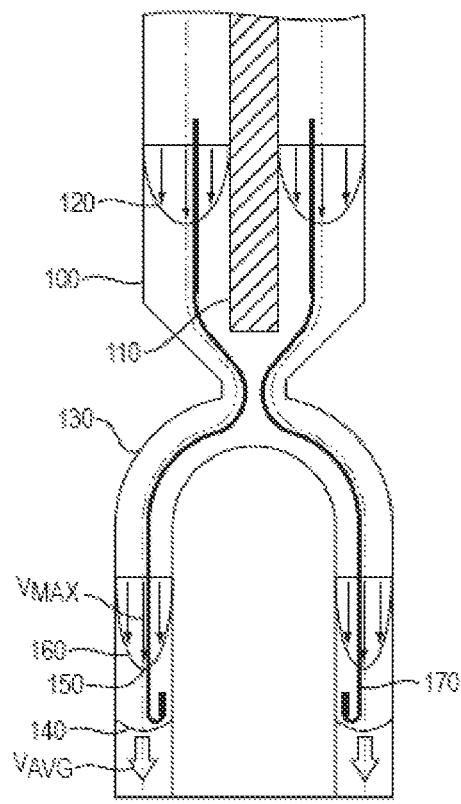
FIG. 26 depicts the interior layer wrapping on itself after reaching the combined flow front.

As taught herein, one manner to control the volumetric flow rate of the inner and outer streams is through the use of a nozzle that includes a moveable throttle pin as depicted in FIG. 26. The function, operation and the structure of the nozzles depicted in FIG. 26 are fully described in U.S. Pat. No. 6,908,581, filed Jan. 31, 2003 and herein incorporated by reference in its entirety. As taught herein, the throttle pin of the nozzle is adjusted up and down as desired to increase or decrease the volumetric flow rate of the inner or outer streams. Other methods to control the relative volumetric flow rate may be used.

As disclosed herein, the upstream inner to outer volumetric flow ratio of a combined polymeric flow that includes an interior core stream can be controlled to either direct the interior core stream into a selected downstream branch channel that branches from a branching junction or direct the interior core stream past a selected downstream branch channel that branches from a branching junction so that the interior core stream continues to flow in a primary channel of the mold cavity.

As disclosed herein, a further aspect of the present invention is taught that controls or avoid breakthrough of the flow-front of the combined polymeric stream by the interior core stream. The control of the interior core stream to avoid break through and the control of the inner to outer volumetric flow ratio can cooperatively occur selectively to direct the interior core stream into or past a downstream branch channel and place a leading edge of the interior core stream at or near a terminal end of the branch channel without breaking through the flow-front of the combined stream. As a result, plastic articles that were previously formed by thermoforming processes can now be formed by co-injection.

To control or avoid breakthrough of the inner and outer flows by the interior core stream and place the leading edge of the interior core stream at or near a terminal end of a branch channel without breakthrough the flow-front, some embodiments teach to control the extrusion start time of the interior core stream relative to the extrusion start time of the inner and outer flows.

Figure 12:
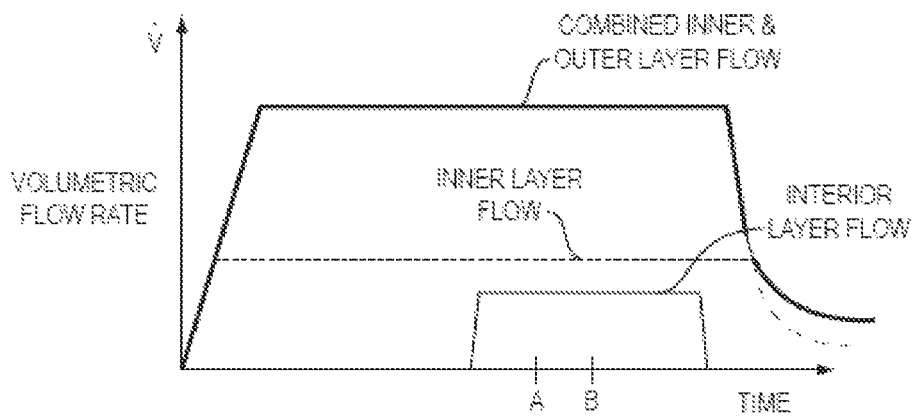
FIG. 12 is a graph showing the relative extrusion start times versus volumetric flow rate for the combined inner and outer streams, the inner stream and the interior core stream.

FIG. 12 graphically depicts the relative timing and proportions of volumetric flow rate of the combined inner and outer layer flows, the inner layer flow and the interior layer flow. The Figures that follow depict fill conditions in a mold cavity and the placement of the leading edge of the interior layer flow with respect to a terminal end of a branch channel in the mold cavity as well as depict how the extrusion start time of the interior layer flow relative to the extrusion start time of the inner and outer flows control the leading edge of the interior layer flow.

In FIG. 12, a graph is presented plotting as a function of time, the volumetric flow rate into the mold cavity of the combined inner and outer flow (top curve), the inner layer flow (middle curve) and the interior layer flow (bottom curve) encompassing the times $T_1$, $T_2$ and $T_3$, respectively representing a time after the start of the combined inner and outer streams, and an intermediate time before the leading-edge of the interior layer has left the extruder to enter the mold cavity. As depicted $T_1 < T_2 < T_3$.

Figure 12A:
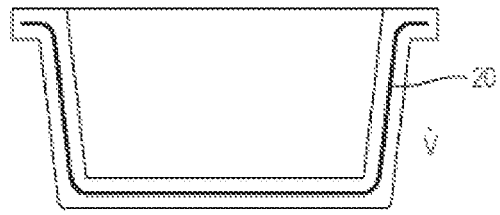
Figure 12B:
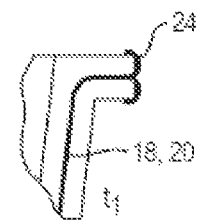
FIG. 12B provides an example whereby the interior core stream is placed on the zero-gradient streamline and is released at time $T_1$ substantially equivalent to the start time of the flow front of the combined stream. The leading edge of the resulting interior core layer breaks through the flow-front of the combined stream.
Figure 12C:
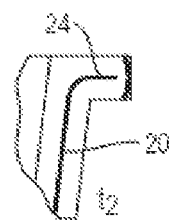
FIG. 12C provides an exemplary molded plastic article whereby the interior core stream was placed on the zero-velocity gradient streamline and released at a release time of $T_2$ such that the leading edge of the resulting interior core layer does not break through the flow-front of the combined polymeric stream.

In FIG. 12A depicts a cross-sectional view of an exemplary article prepared by the methods and systems described herein wherein the branch channel is straight and protrudes from a position near the open end of the article. The interior core stream travels along the zero-velocity gradient streamline in the branch channel. FIG. 12B depicts a start time for the interior core stream of $T_1$ which allows the interior layer leading edge to catch up to the combined stream flow front. The interior core stream of FIG. 12B breaks through the flow-front of the combined polymeric stream. At a release time of $T_2$, the interior core stream enters at a later time subsequent to the start of the inner and outer streams, and the leading edge of the interior core stream does not catch up to the flow front and does not break through the flow-front.

Figure 13A:
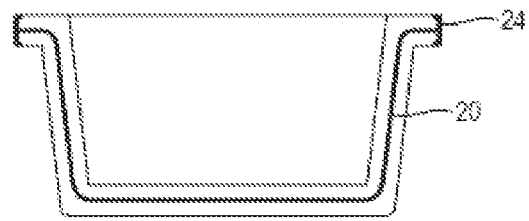
FIGS. 13A and 13B are cross-sectional views of a co-extrusion molded plastic article having a protrusion defined by a downstream branch channel wherein the interior core stream is released at release time $T_1$ and is not offset such that the combined radial distance of the resulting inner and outer layers consists of 50% of the outer layer and 50% of the inner layer. The leading edge of the resulting interior core layer breaks through the flow-front.

FIG. 13A provides a cross-sectional view of an exemplary embodiment of a mold cavity and the resulting fill as taught by the methods and systems disclosed herein. Those skilled in the art will appreciate that the proper fill of the mold cavity results in a molded plastic article having a like shape and geometry as depicted in FIG. 13A. In this exemplary embodiment, the resultant plastic article is a cup-shaped article which comprises a body portion and a protrusion portion formed as a lip about the terminal portion of the open end of the body portion. The lip extends radially outward from the open end of the cup-shaped article. The cup-shaped article comprises a skin having an inner layer formed from the inner stream and having an outer layer formed from the outer stream. Encompassed within the skin is an interior core layer formed from the interior core stream. In this embodiment, the skin polymeric material and the interior core stream polymeric material flow continuously in the primary channel of the mold cavity defining the body portion into a branch channel defining the protrusion portion and the leading edge of the interior core stream is place at or near the terminal end of the branch channel.

Figure 13B:
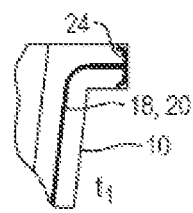

FIG. 13B depicts the resulting fill of the mold cavity when the extrusion start time of the interior core layer starts at time $T_1$ and the extrusion start time of the inner and outer layers starts at time $T_0$ and the inner to outer volumetric flow ratio is 50:50 entering the branch channel of the mold cavity. With a volumetric flow ratio of 50:50 the interior core stream is placed on the zero-velocity gradient of the combined velocity profile. As depicted in FIG. 13B under these conditions the leading edge of interior core stream breaks through the flow-front of the combined polymeric stream (inner and outer streams) before the mold cavity is filled.

Figure 13C:
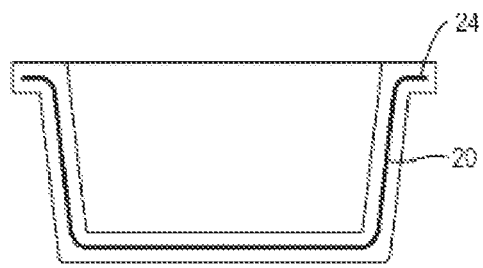
FIGS. 13C and 13D are cross-sectional views of a co-extrusion molded plastic article having a straight flange wherein the extrusion of the interior core stream is started at release time $T_2$ and is not offset such that the combined radial distance of the resulting inner and outer layers consists of 50% of the outer layer and 50% of the inner layer. The leading edge of the resulting interior core layer does not break through the flow-front.
Figure 13D:
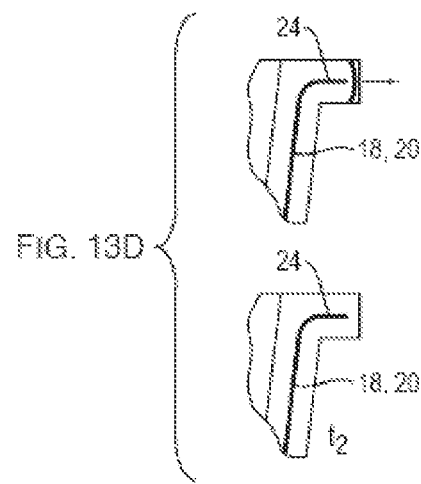

FIGS. 13C and 13D depict the resulting fill of the mold cavity when the extrusion start time of the interior layer starts at time $T_2$ and the extrusion start time of the inner and outer layers start at time $T_0$ and the inner to outer volumetric flow ratio is 50:50 entering the branch channel of the mold cavity. With a volumetric flow ratio of 50:50 the interior core stream is placed on the zero-velocity gradient of the combined velocity profile. As depicted in FIG. 13C under these conditions the leading edge of the interior stream does not breach the flow-front of the inner and outer layers before the mold cavity is filled and the leading edge of the interior core stream is place at or near the terminal end of the branch channel.

Figure 13E:
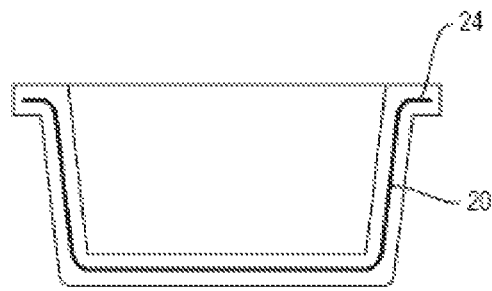
FIGS. 13E and 13F are cross-sectional views of a co-extrusion molded plastic article having a straight flange wherein the extrusion of the interior core stream is started at release time $T_3$ and is not offset such that the combined radial distance of the resulting inner and outer layers consists of 50% of the outer layer and 50% of the inner layer. The leading edge of the resulting interior core layer does not break through the flow-front and is slightly further from the outer rim diameter edge than FIG. 13D
Figure 13F:
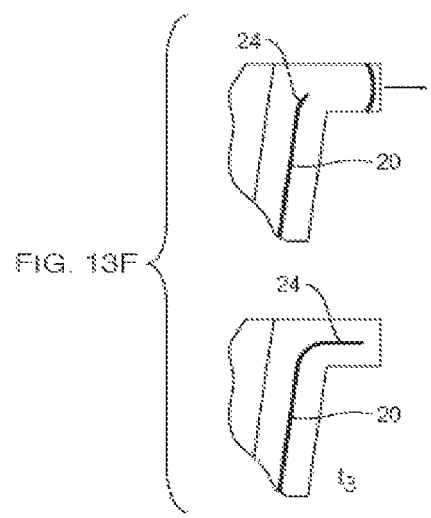

FIGS. 13E and 13F depict the resulting fill of the mold cavity when the extrusion start time of the interior layer starts at time $T_3$ and the extrusion start time of the inner and outer layers start at time $T_0$ and the inner to outer volumetric flow ratio is 50:50 entering the branch channel of the mold cavity. With a volumetric flow ratio of 50:50 the interior core stream is placed on the zero-velocity gradient of the combined velocity profile. As depicted in FIGS. 13E and 13F under these conditions the interior core stream does not reach the terminal end of the branch channel because the leading edge of the interior core stream was too far behind the flow-front of the inner and outer streams. FIGS. 13E and 13F depict an undesirable condition as the resulting plastic article does not include an effective interior layer to seal the wall portions of the container.

Figure 14A:
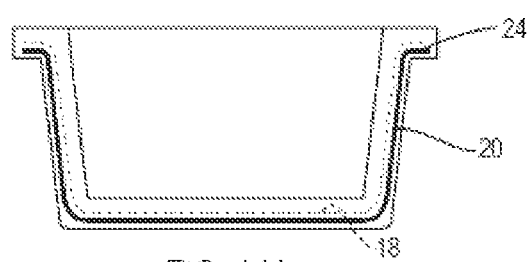
FIG. 14A is a cross-sectional view of a co-extrusion molded plastic article having a straight flange wherein the resulting interior core layer is offset such that the combined radial distance of the resulting inner and outer layers consists of either 20% of the outer layer and 80% of the inner layer or 40% of the outer and 60% of the inner.

FIG. 14A provides a cross-sectional view of an exemplary embodiment of a mold cavity and the resulting fill as taught by the methods and systems disclosed herein. Those skilled in the art will appreciate that the proper fill of the mold cavity results in a molded plastic article having a like shape and geometry as depicted in FIG. 14A. In this exemplary embodiment, the resultant plastic article is a cup-shaped article which comprises a body portion and a protrusion portion formed as a lip about the terminal portion of the open end of the body portion. The lip extends radially outward from the open end of the cup-shaped article. The cup-shaped article comprises a skin having an inner layer formed from the inner stream and having an outer layer formed from the outer stream. Encompassed within the skin is an interior core layer formed from the interior core stream. In this embodiment, the skin polymeric material and the interior core stream polymeric material flow continuously from the primary channel of the mold cavity defining the body portion into a branch channel defining the protrusion portion and the leading edge of the interior core stream is place at or near the terminal end of the branch channel.

Figure 14B:
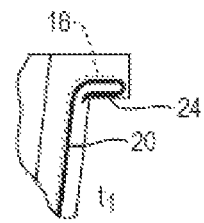
FIG. 14B is a cross-sectional view of a co-extrusion molded plastic article having a straight flange wherein the interior core stream has a start time of $T_1$ and is offset such that the combined radial distance of the resulting inner and outer layers consists of either 20% of the outer layer and 80% of the inner layer or 40% of the outer and 60% of the inner. The resulting interior core layer wraps around on itself toward the outer layer.
Figure 14C:
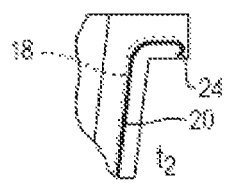
FIG. 14C is a cross-sectional view of a co-extrusion molded plastic article having a straight flange wherein the interior core stream has a start time of $T_2$ and is offset such that the combined radial distance of the resulting inner and outer layers consists of either 20% of the outer layer and 80% of the inner layer or 40% of the outer and 60% of the inner. The resulting interior core layer wraps around on itself toward the outer stream.

FIGS. 14B and 14C depict the resulting fill of the mold cavity when the extrusion start time of the interior core layer starts at time $T_1$ and $T_2$, and the extrusion start time of the inner and outer layers starts at time $T_0$ and the inner to outer volumetric flow ratio is 80:20 or 60:40 entering the branch channel of the mold cavity. The inner and outer PET or PP streams and the interior core stream are injected in a way that causes the interior core layer to fold over on itself 24, without breaking through the combined flow-front as shown in FIG. 14B. Because the interior core stream is injected along a streamline having a velocity greater than the average combined flow velocity, but less than the velocity Vmax at the zero-velocity gradient streamline 18, the interior core wraps around near the flow-front. With an inner:outer volumetric flow ratio of 80:20 or 60:40 the interior core stream is placed at an 80:20 or 60:40 offset position on the velocity gradient of the combined velocity profile. As depicted in FIG. 14B, under these conditions the interior core stream curls over on itself toward the outer stream. This method creates good part coverage, because the leading edge is uniformly communicated to a terminal end of the branch channel.

Figure 14D:
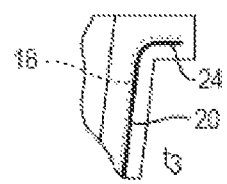
FIG. 14D is a cross-sectional view of a co-extrusion molded plastic article having a straight flange wherein the interior core stream has a start time of $T_3$ and is offset such that the combined radial distance of the resulting inner and outer layers consists of either 20% of the outer layer and 80% of the inner layer or 40% of the outer and 60% of the inner. The resulting interior core layer does not wrap around on itself toward the outer stream.

FIG. 14C depicts the plastic article formed by the methods and systems of the present invention wherein the interior core stream is released at a start time of $T_2$ while FIG. 14D depicts a start time of $T_3$. At a start time of $T_2$, the interior core stream also folds around on itself but to a lesser extent than at a start time of $T_1$. At a start time of $T_3$, the interior core stream is communicated along the branch channel such that the leading edge of the interior core stream is terminated at a position that is substantially adjacent to the flow-front. At start times, $T_1$, $T_2$ and $T_3$, and an 80:20 or 60:40 offset, the interior core does not break through the flow-front and the interior core stream is communicated to a position substantially adjacent to the flow-front.

Figure 14E:
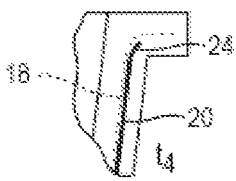
FIG. 14E is a cross-sectional view of a co-extrusion molded plastic article having a straight flange wherein the interior core stream has a start time of $T_4$ and is offset such that the combined radial distance of the resulting inner and outer layers consists of either 20% of the outer layer and 80% of the inner layer or 40% of the outer and 60% of the inner. The leading edge of the resulting interior core layer does not reach a terminal end that is substantially adjacent to the flow front and does not wrap around on itself.

FIG. 14E depicts a start time for the interior core of $T_4$. While the interior core stream is selectively placed in the chosen branch channel due to the offset position of the interior core stream, the leading edge does not reach a position that is substantially adjacent to the flow-front. In preferred embodiments of the present invention, the interior core stream is communicated to a position that is substantially adjacent to the flow-front.

Figure 15A:
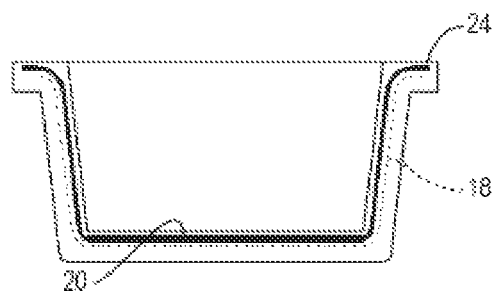
FIG. 15A is a cross-sectional view of a co-extrusion molded plastic article having a straight flange wherein the interior core stream is offset such that the combined radial distance of the resulting inner and outer layers consists of either 80% of the outer layer and 20% of the inner layer or 60% of the outer and 40% of the inner.

FIG. 15A provides a cross-sectional view of an exemplary embodiment of a mold cavity and the resulting fill as taught by the methods and systems disclosed herein. Those skilled in the art will appreciate that the proper fill of the mold cavity results in a molded plastic article having a like shape and geometry as depicted in FIG. 15A. In this exemplary embodiment, the resultant plastic article is a cup-shaped article which comprises a body portion and a protrusion portion formed as a lip about the terminal portion of the open end of the body portion. The lip extends radially outward from the open end of the cup-shaped article to form a straight protrusion. The cup-shaped article comprises a skin having an inner layer formed from the inner stream and having an outer layer formed from the outer stream. Encompassed within the skin is an interior core layer formed from the interior core stream. In this embodiment, the skin polymeric material and the interior core stream polymeric material flow continuously from the primary channel of the mold cavity defining the body portion into a branch channel defining the protrusion portion and the leading edge of the interior core stream is place at or near the terminal end of the branch channel.

Figure 15B:
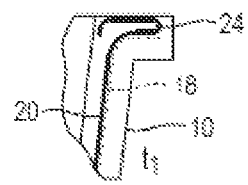
FIG. 15B is a cross-sectional view of a co-extrusion molded plastic article having a straight flange wherein the interior core stream has a start time of $T_1$ and is offset such that the combined radial distance of the resulting inner and outer layers consists of either 80% of the outer layer and 20% of the inner layer or 60% of the outer and 40% of the inner. The resulting interior core layer wraps around itself toward the inner stream.

FIGS. 15B, 15C, 15D and 15E depict embodiments wherein the interior core stream is released at a start time of $T_1$, $T_2$, $T_3$ and $T_4$ respectively. At release time $T_1$ interior core 18 is communicated along a 20:80 or 40:60 offset as it is selectively communicated to a desired branch channel as depicted in FIG. 15B. Here the interior core reaches a position that is substantially adjacent to the flow-front and wraps around on itself as it catches up to the flow-front. This method creates good part coverage, because the leading edge is uniformly communicated to a terminal end of the branch channel.

Figure 15C:
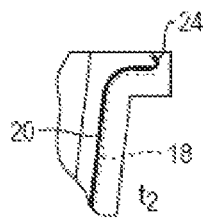
FIG. 15C is a cross-sectional view of a co-extrusion molded plastic article having a straight flange wherein the interior core stream has a start time of $T_2$ and is offset such that the combined radial distance of the resulting inner and outer layers consists of either 80% of the outer layer and 20% of the inner layer or 60% of the outer and 40% of the inner. The leading edge of the resulting interior core layer is communicated to a position that is substantially adjacent to the flow-front of the combined stream and wraps around towards the inner layer.
Figure 15D:
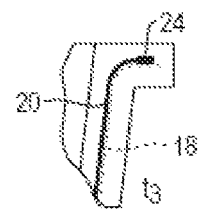
FIG. 15D is a cross-sectional view of a co-extrusion molded plastic article having a straight flange wherein the interior core stream has a start time of $T_3$ and is offset such that the combined radial distance of the resulting inner and outer layers consists of either 80% of the outer layer and 20% of the inner layer or 60% of the outer and 40% of the inner. The leading edge of the resulting interior core layer is communicated to a position that is substantially adjacent to the flow-front of the combined stream.
Figure 15E:
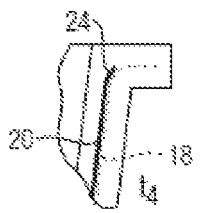
FIG. 15E is a cross-sectional view of a co-extrusion molded plastic article having a straight flange wherein the interior core stream has a start time of $T_4$ and is offset such that the combined radial distance of the resulting inner and outer layers consists of either 80% of the outer layer and 20% of the inner layer or 60% of the outer and 40% of the inner. The leading edge of the resulting interior core layer does not break through but also is not communicated to a position substantially adjacent to the flow-front of the combined stream.

FIG. 15C depicts a start time for the interior core of $T_2$. While the interior core wraps around on itself, it does so at a lesser extent than when the interior core stream is released at a start time of $T_1$ because the interior core takes longer to catch up to the flow-front of the combined stream. At a release time of $T_3$ as depicted in FIG. 15D, the leading edge of the interior core does not reach the flow-front and does not wrap around. However, as depicted in FIG. 15D, the leading edge is communicated to a position that is substantially adjacent to the flow-front. This method creates good part coverage, because the leading edge is uniformly communicated to a terminal end of the branch channel. Where the release time of the interior core stream is at a start time $T_4$, while the interior core stream is selectively communicated along a desired streamline and desired branch channel, the leading edge of the interior core does not reach a position that is substantially adjacent to the flow-front. In preferred embodiments of the present invention, the interior core stream is communicated to a position that is substantially adjacent to the flow-front.

Figure 16A:
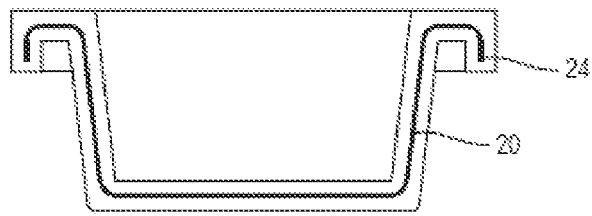
FIG. 16A is a cross-sectional view of a co-extrusion molded plastic article having a n-shaped flange wherein the interior core stream is not offset such that the combined radial distance of the resulting inner and outer layers consists of 50% of the outer layer and 50% of the inner layer.
Figure 17A:
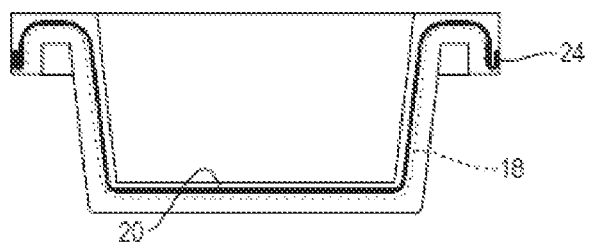
FIG. 17A is a cross-sectional view of a co-extrusion molded plastic article having a n-shaped flange wherein the interior core stream is offset such that the combined radial distance of the resulting inner and outer layers consists of either 80% of the outer layer and 20% of the inner layer or 60% of the outer layer and 40% of the inner layer. The leading edge of the resulting interior core stream is communicated to a position that is substantially adjacent to the flow-front of the combined stream.
Figure 18A:
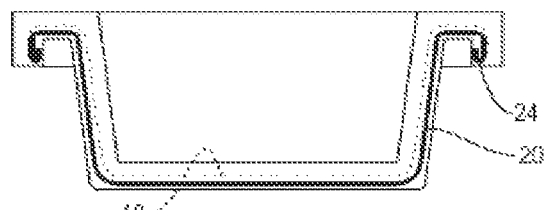
FIG. 18A is a cross-sectional view of a co-extrusion molded plastic article having a n-shaped flange wherein the interior core stream is offset such that the combined radial distance of the resulting inner and outer layers consists of either 20% of the outer layer and 80% of the inner layer or 40% of the outer layer and 60% of the inner layer.

FIGS. 16A, 17A, and 18A depict a cross-sectional view of an exemplary embodiment of a mold cavity and the resulting fill as taught by the methods and systems disclosed herein. Those skilled in the art will appreciate that the proper fill of the mold cavity results in a molded plastic article having a like shape and geometry as depicted in FIGS. 16A, 17A, and 18A. In FIG. 16A, the interior core travels along the zero-velocity gradient in the branch channel. In FIG. 17A, the interior core stream is offset at a position of 20:80 or 40:60 while in FIG. 18A, the interior core stream is offset at a position of 80:20 or 60:40. In these exemplary embodiments, the resultant plastic article is a cup-shaped article which comprises a body portion and a protrusion portion formed as a lip about the terminal portion of the open end of the body portion. The lip extends radially outward from the open end of the cup-shaped article to form an n-shaped protrusion. The cup-shaped article comprises a skin having an inner layer formed from the inner stream and having an outer layer formed from the outer stream. Encompassed within the skin is an interior core layer formed from the interior core stream. In this embodiment, the skin polymeric material and the interior core stream polymeric material flow continuously from the primary channel of the mold cavity defining the body portion into a branch channel defining the protrusion portion and the leading edge of the interior core stream is place at or near the terminal end of the branch channel.

Figure 16B:
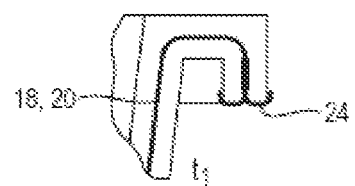
Figure 16C:
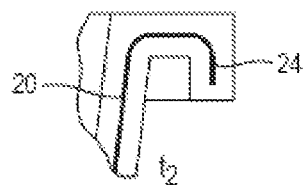
FIG. 16C is a cross-sectional view of a co-extrusion molded plastic article having a n-shaped flange wherein the interior core stream has a start time of $T_2$ and is not offset such that the combined radial distance of the resulting inner and outer layers consists of 50% of the outer layer and 50% of the inner layer. The leading edge of the resulting interior core layer is communicated to a position that is substantially adjacent to the flow-front of the combine stream, but does not break through the flow front.
Figure 16D:
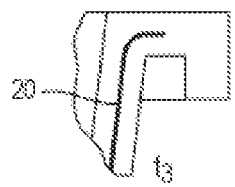
FIG. 16D is a cross-sectional view of a co-extrusion molded plastic article having an n-shaped flange wherein the interior core stream has a start time of $T_3$ and is not offset such that the combined radial distance of the resulting inner and outer layers consists of 50% of the outer layer and 50% of the inner layer. The leading edge of the resulting interior core does not break through but also is not communicated to a position substantially adjacent to the flow-front of the combined stream.

FIG. 16B depicts the release time of the interior core stream at a start time of $T_1$ and a 50:50 streamline placement of the interior core as it travels along the branch channel. As depicted in FIG. 16B, the leading edge of the interior core breaks through the flow-front. In preferred embodiments, the interior core does not break through the flow-front. For example, in FIG. 16C, the interior core travels along the 50:50 zero-gradient streamline in the branch channel but the leading edge 24 does not break through the flow-front. The interior core stream is released at a start time $T_2$ and never catches up to the flow-front. This method creates good part coverage, because the leading edge is uniformly communicated to a terminal end of the branch channel that is substantially adjacent to the flow-front. By contrast, FIG. 16D depicts where the interior core stream is released at a time $T_3$. While the interior core stream is selectively communicated to a desired branch channel, the leading edge of the interior core does not reach a terminal end in the branch channel that is substantially adjacent to the flow-front.

Figure 17B:
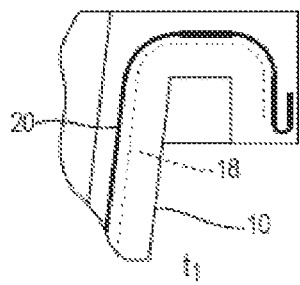
FIG. 17B is a cross-sectional view of a co-extrusion molded plastic article having a n-shaped flange wherein the interior core stream has a start time of $T_1$ and is offset such that the combined radial distance of the resulting inner and outer layers consists of either 80% of the outer layer and 20% of the inner layer or 60% of the outer layer and 40% of the inner layer. The leading edge of the resulting interior core stream is communicated to a position that is substantially adjacent to the flow-front of the combined stream and wraps around on itself.
Figure 17C:
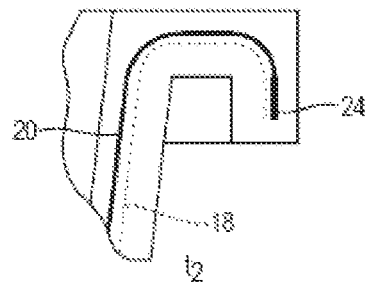
FIG. 17C is a cross-sectional view of a co-extrusion molded plastic article having a n-shaped flange wherein the interior core stream has a start time of $T_2$ and is offset such that the combined radial distance of the resulting inner and outer layers consists of either 80% of the outer layer and 20% of the inner layer or 60% of the outer layer and 40% of the inner layer. The leading edge of the resulting interior core stream is communicated to a position that is substantially adjacent to the flow-front of the combined stream, but does not wrap on itself.

FIG. 17B depicts the release time of the interior core stream at a start time of $T_1$ and a 20:80 or 40:60 offset streamline of the interior core as it travels along the branch channel. As depicted in FIG. 17B, the leading edge of the interior core stream catches up to the flow-front and folds over on itself towards the inner layer. In preferred embodiments, the interior core does not break through the flow-front. In FIG. 17C, the interior core travels along the 20:80 or 40:60 offset streamline in the branch channel and is released at a start time of $T_2$ such that the leading edge 24 is communicated to a position that is substantially adjacent to the flow-front without breaking through.

Figure 18B:
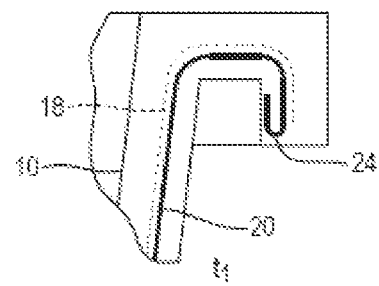
FIG. 18B is a cross-sectional view of a co-extrusion molded plastic article n-shaped flange wherein the interior core stream has a start time of T1 and is offset such that the combined radial distance of the resulting inner and outer layers consists of either 20% of the outer layer and 80% of the inner layer or 40% of the outer layer and 60% of the inner layer. The leading edge of the resulting interior core stream is communicated to a position that is substantially adjacent to the flow-front of the combined stream and wraps around on itself.
Figure 18C:
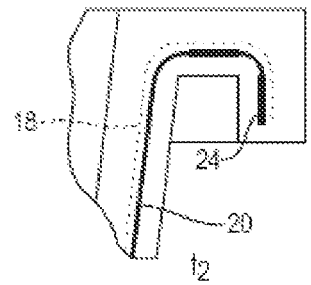
FIG. 18C is a cross-sectional view of a co-extrusion molded plastic article having a n-shaped flange wherein the interior core stream has a start time of $T_2$ and is offset such that the combined radial distance of the resulting inner and outer layers consists of either 20% of the outer layer and 80% of the inner layer or 40% of the outer layer and 60% of the inner layer. The leading edge of the resulting interior core stream is communicated to a position that is substantially adjacent to the flow-front of the combined stream, but does not wrap on itself.

FIG. 18B depicts the release time of the interior core stream at a start time of $T_1$ and a 80:20 or 60:40 offset streamline of the interior core as it travels along the branch channel. As depicted in FIG. 18B, the leading edge of the interior core stream catches up to the flow-front and folds over on itself towards the outer layer. In preferred embodiments, the interior core does not break through the flow-front. In FIG. 18C, the interior core travels along the 80:20 or 60:40 offset streamline in the branch channel and is released at a start time of $T_2$ such that the leading edge 24 is communicated to a position that is substantially adjacent to the flow-front without breaking through.

FIGS. 19A, 20A, 21A and 22A depict a cross-sectional view of an exemplary embodiment of a mold cavity and the resulting fill as taught by the methods and systems disclosed herein, where the interior core travels along the 20:80, 40:60, 60:40 and 80:20 streamlines, respectively. Those skilled in the art will appreciate that the proper fill of the mold cavity results in a molded plastic article having a like shape and geometry as depicted in FIGS. 19A, 20A, 21A and 22A. In these exemplary embodiments, the resultant plastic article is a cup-shaped article which comprises a body portion and a protrusion portion formed as a lip about the terminal portion of the open end of the body portion. The lip extends radially outward from the open end of the cup-shaped article to form a T-shaped protrusion. The cup-shaped article comprises a skin having an inner layer formed from the inner stream and having an outer layer formed from the outer stream. Encompassed within the skin is an interior core layer formed from the interior core stream. In this embodiment, the skin polymeric material and the interior core stream polymeric material flow continuously from the primary channel of the mold cavity defining the body portion into a branch channel defining the protrusion portion and the leading edge of the interior core stream is place at or near the terminal end of the branch channel.

Figure 19A:
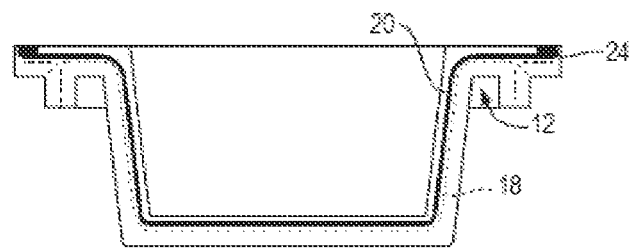
FIG. 19A is a cross-sectional view of a co-extrusion molded plastic article having a T-shaped flange wherein the interior core stream is offset such that the combined radial distance of the resulting inner and outer layers consists of 80% of the outer layer and 20% of the inner layer.
Figure 19B:
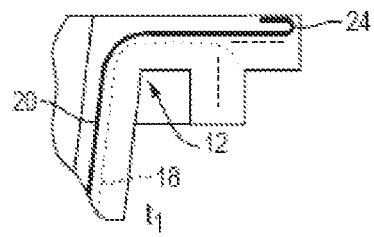
FIG. 19B is a cross-sectional view of a co-extrusion molded plastic article having a T-shaped flange wherein the interior core stream has a start time of $T_1$ and is offset such that the combined radial distance of the resulting inner and outer layers consists of 80% of the outer layer and 20% of the inner layer. The leading edge of the resulting interior core layer is communicated to a position that is substantially adjacent to the flow-front of the combined stream and wraps around on itself.
Figure 19C:
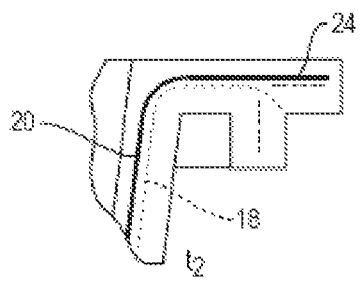
FIG. 19C is a cross-sectional view of a co-extrusion molded plastic article having a T-shaped flange wherein the interior core stream has a start time of $T_2$ and is offset such that the combined radial distance of the resulting inner and outer layers consists of 80% of the outer layer and 20% of the inner layer. The leading edge of the resulting interior core layer is communicated to a position that is substantially adjacent to the flow-front of the combined stream, but does not wrap on itself.
Figure 19D:
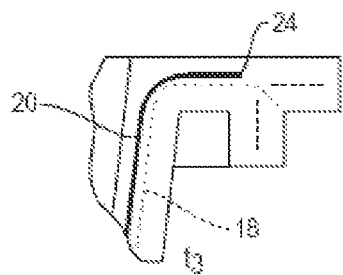
FIG. 19D is a cross-sectional view of a co-extrusion molded plastic article having a T-shaped flange wherein the interior core stream has a start time of $T_3$ and is offset such that the combined radial distance of the resulting inner and outer layers consists of 80% of the outer layer and 20% of the inner layer. The leading edge of the resulting interior core layer does not reach a terminal end that is substantially adjacent to the flow front and does not wrap on itself.

FIG. 19A depicts the resulting fill of the mold cavity when the extrusion start time of the interior layer starts at time $T_1$ and the extrusion start time of the inner and outer layers start at time $T_0$ and the inner to outer volumetric flow ratio is 20:80 entering the branch channel of the mold cavity. With a volumetric flow ratio of 20:80, the interior core stream is placed along a streamline having a velocity less than is greater than the average velocity of the combined stream but less than the velocity of the zero-gradient velocity streamline. As depicted in FIGS. 19B, 19C and 19D, where the interior core stream is released at a starting time of $T_1$, $T_2$ and $T_3$ respectively, the leading edge of the interior core does not break through the flow-front under these conditions. However, FIGS. 19B and 19C, having start times of $T_1$ and $T_2$, depict preferred embodiments as the interior core stream is both selectively placed along a desired streamline and branch channel and the leading edge is communicated to a position that is substantially adjacent to the flow-front. However, as depicted in FIG. 19D, where the interior core stream has a start time of $T_3$ it does not reach a position that is substantially adjacent to the flow-front. FIG. 19D depicts an undesirable condition as the resulting plastic article does not include an effective interior layer to seal the wall portions of the container. The T-shaped protrusion of FIGS. 19A-19D depicts an additional junction within the protrusion that is downstream from the junction that's formed by the primary channel and the protrusion.

Figure 20A:
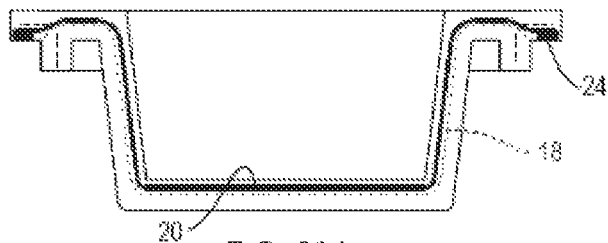
FIG. 20A is a cross-sectional view of a co-extrusion molded plastic article having a T-shaped flange wherein the interior core stream is offset such that the combined radial distance of the resulting inner and outer layers consists of 60% of the outer layer and 40% of the inner layer. The interior core stream crosses the zero-velocity gradient streamline in the downstream branch channel.

FIG. 20A depicts the resulting fill of the mold cavity when the extrusion start time of the interior layer starts at time $T_1$ and the extrusion start time of the inner and outer layers start at time $T_0$ and the inner to outer volumetric flow ratio is 40:60 entering the branch channel of the mold cavity. With a volumetric flow ratio of 40:60, the interior core stream is placed along a streamline having a velocity greater than the average velocity of the combined stream but less than the velocity of the zero-gradient velocity streamline.

Figure 20B:
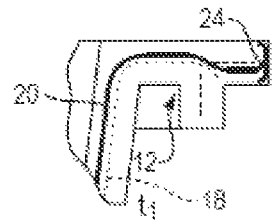
FIG. 20B is a cross-sectional view of a co-extrusion molded plastic article having a T-shaped flange wherein the interior core stream has a start time of $T_1$ and is offset such that the combined radial distance of the resulting inner and outer layers consists of 60% of the outer layer and 40% of the inner layer. The interior core stream crosses the zero-velocity gradient streamline and reaches a position that is substantially adjacent to the flow-front of the combined stream in the downstream branch channel.

As depicted in FIG. 20B, where the interior core stream is released at a starting time $T_1$ the leading edge of the interior core breaks through the flow-front. The $T_1$ start time allows the interior core stream to cross the zero velocity gradients in the downstream terminal branch and to break through the flow front.

Figure 20C:
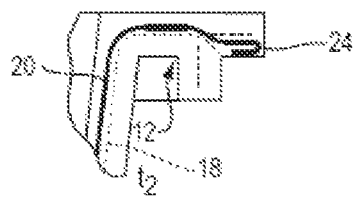
FIG. 20C is a cross-sectional view of a co-extrusion molded plastic article having a T-shaped flange wherein the interior core stream has a start time of $T_2$ is offset such that the combined radial distance of the resulting inner and outer layers consists of 60% of the outer layer and 40% of the inner layer. The interior core stream crosses the zero-velocity gradient streamline and reaches a position that is substantially adjacent to the flow-front of the combined stream in the downstream branch channel, and wraps around on itself.
Figure 20D:
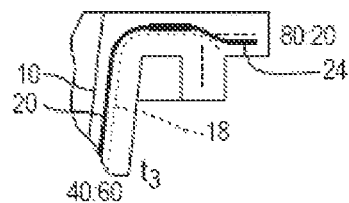
FIG. 20D is a cross-sectional view of a co-extrusion molded plastic article having a T-shaped flange wherein the interior core stream has a start time of $T_3$ and is offset such that the combined radial distance of the resulting inner and outer layers consists of 60% of the outer layer and 40% of the inner layer. The interior core stream crosses the zero-velocity gradient streamline and reaches a position that is substantially adjacent to the flow-front of the combined stream in the downstream branch channel, but does not wrap on itself.
Figure 20E:
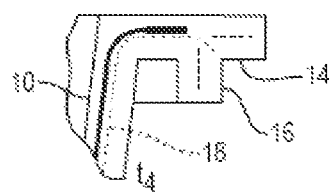
FIG. 20E is a cross-sectional view of a co-extrusion molded plastic article wherein the interior core stream has a start time of $T_4$ and is offset such that the combined radial distance of the resulting inner and outer layers consists of 60% of the outer layer and 40% of the inner layer. The leading edge of the interior core stream does not reach a position that is substantially adjacent to the flow-front of the combined stream and does not reach the downstream branch channel.

As depicted in FIGS. 20C, 20D and 20E, where the interior core stream is released at a starting time of T2, $T_3$ and $T_4$, respectively, the leading edge of the interior core does not break through the flow-front under these conditions. In each embodiment depicted in 20C, 20D and 20E, upon crossing the junction 12, the interior core stream 20 crosses the zero-velocity streamline 18.

FIGS. 20C and 20D, having start times of $T_2$, and $T_3$ depict preferred embodiments as the interior core stream is both selectively placed along a desired streamline and branch channel and the leading edge is communicated to a position that is substantially adjacent to the flow-front. On the other hand, as depicted in FIG. 20E, where the interior core stream has a start time of $T_4$ it does not reach a position that is substantially adjacent to the flow-front. FIG. 20E depicts an undesirable condition as the resulting plastic article does not include an effective interior layer to seal the wall portions of the container. The T-shaped protrusion of FIGS. 20A-20E depicts an additional junction within the protrusion that is downstream from the junction that's formed by the primary channel and the protrusion.

Figure 21A:
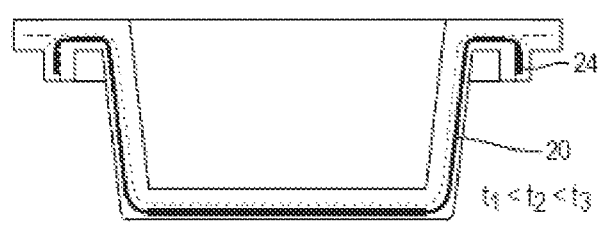
FIG. 21A is a cross-sectional view of a co-extrusion molded plastic article having a T-shaped flange wherein the interior core stream is offset such that the combined radial distance of the resulting inner and outer layers consists of 40% of the outer layer and 60% of the inner layer.

FIG. 21A depicts the resulting fill of the mold cavity when the extrusion start time of the interior layer starts at time $T_1$ and the extrusion start time of the inner and outer layers start at time $T_0$ and the inner to outer volumetric flow ratio is 60:40 entering the branch channel of the mold cavity. With a volumetric flow ratio of 60:40, the interior core stream is placed along a streamline having a velocity greater than the average velocity of the combined stream but less than the velocity of the zero-gradient velocity streamline.

Figure 21B:
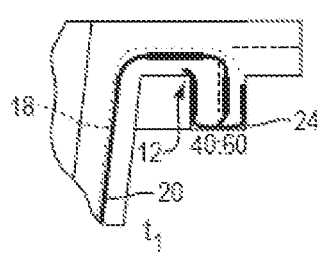
FIG. 21B is a cross-sectional view of a co-extrusion molded plastic article having a T-shaped flange wherein the interior core stream has a start time of $T_1$ and is offset such that the combined radial distance of the resulting inner and outer layers consists of 60% of the outer layer and 40% of the inner layer. The interior core stream is communicated to a position that is substantially adjacent to the flow-front of the combined stream and wraps on itself in the downstream branch channel.

As depicted in FIG. 21B where the interior core stream is released at a starting time of $T_1$ the leading edge of the interior core stream crosses the zero velocity gradient in the downstream terminal branch and breaks through the flow-front.

Figure 21C:
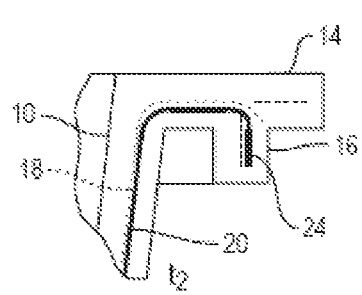
FIG. 21C is a cross-sectional view of a co-extrusion molded plastic article having a T-shaped flange wherein the interior core stream has a start time of $T_2$ and is offset such that the combined radial distance of the resulting inner and outer layers consists of 60% of the outer layer and 40% of the inner layer. The interior core stream is communicated to a position that is substantially adjacent to the flow-front of the combined stream in the downstream branch channel, but does not wrap on itself.
Figure 21D:
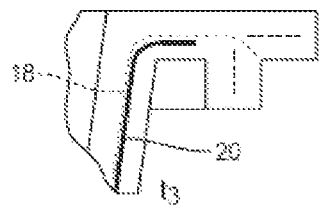
FIG. 21D is a cross-sectional view of a co-extrusion molded plastic article having a T-shaped flange wherein the interior core stream has a start time of $T_3$ and is offset such that the combined radial distance of the resulting inner and outer layers consists of 60% of the outer layer and 40% of the inner layer. The interior core stream is communicated to a position that is not substantially adjacent to the flow-front of the combined stream and does not enter the downstream branch channel.

As depicted in FIGS. 21C and 21D, where the interior core stream is released at a starting time of $T_2$, and $T_3$, respectively, the leading edge of the interior core does not break through the flow-front under these conditions. FIG. 21C depicting the start time of $T_2$ depicts an embodiment as the interior core stream is both selectively placed along a desired streamline and branch channel and the leading edge is communicated to a position that is substantially adjacent to the flow-front. On the other hand, as depicted in FIG. 21D, where the interior core stream has a start time of $T_3$ it does not reach a position that is substantially adjacent to the flow-front. FIG. 21D depicts an undesirable condition as the resulting plastic article does not include an effective interior layer to seal the wall portions of the container. The T-shaped protrusion of FIGS. 21A-21D depicts an additional junction within the protrusion that is downstream from the junction that's formed by the primary channel and the protrusion.

Figure 22A:
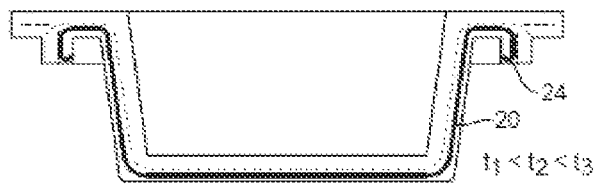
FIG. 22A is a cross-sectional view of a co-extrusion molded plastic article having a T-shaped flange wherein the interior core stream is offset such that the combined radial distance of the resulting inner and outer layers consists of 20% of the outer layer and 80% of the inner layer.
Figure 22B:
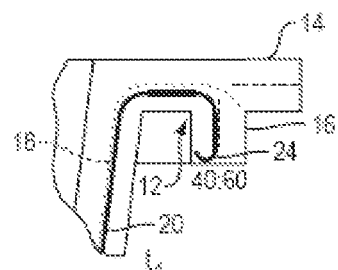
FIG. 22B is a cross-sectional view of a co-extrusion molded plastic article having a T-shaped flange wherein the interior core stream has a start time of $T_1$ and is offset such that the combined radial distance of the resulting inner and outer layers consists of 20% of the outer layer and 80% of the inner layer. The leading edge of the resulting interior core layer is communicated to a position that is substantially adjacent to the flow-front of the combined stream and wraps around on itself in the downstream branch channel.
Figure 22C:
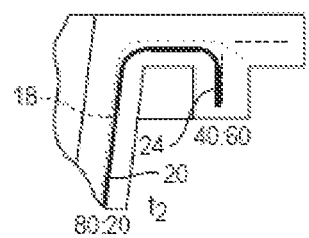
FIG. 22C is a cross-sectional view of a co-extrusion molded plastic article having a T-shaped flange wherein the interior core stream has a start time of $T_2$ and is offset such that the combined radial distance of the resulting inner and outer layers consists of 20% of the outer layer and 80% of the inner layer. The leading edge of the resulting interior core layer is communicated to a position that is substantially adjacent to the flow-front of the combined stream, but does not wrap on itself.
Figure 22D:
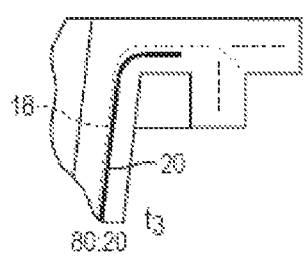
FIG. 22D is a cross-sectional view of a co-extrusion molded plastic article having a T-shaped flange wherein the interior core stream has a start time of $T_3$ and is offset such that the combined radial distance of the resulting inner and outer layers consists of 20% of the outer layer and 80% of the inner layer. The leading edge of the resulting interior core layer is communicated to a position that is not substantially adjacent to the flow-front of the combined stream, but does not enter the downstream branch channel.

FIG. 22A depicts the resulting fill of the mold cavity when the extrusion start time of the interior layer starts at time $T_1$ and the extrusion start time of the inner and outer layers start at time $T_0$ and the inner to outer volumetric flow ratio is 80:20 entering the branch channel of the mold cavity. With a volumetric flow ratio of 80:20, the interior core stream is placed along a streamline having a velocity greater than the average velocity of the combined stream but less than the velocity of the zero-gradient velocity streamline. As depicted in FIG. 22B, the leading edge of the interior core stream catches up to the flow-front and folds over on itself towards the outer layer when the interior core stream is released at time $T_1$. As depicted in FIG. 22C, where the interior core stream is released at a starting time of $T_2$, the leading edge of the interior core stream is communicated to a position that is substantially adjacent to the flow-front does not break through the flow-front under these conditions. On the other hand, as depicted in FIG. 22D, where the interior core stream has a start time of $T_3$ it does not reach a position that is substantially adjacent to the flow-front. FIG. 22D depicts an undesirable condition as the resulting plastic article does not include an effective interior layer to seal the wall portions of the container. The T-shaped protrusion of FIGS. 22A-22D depicts an additional junction within the protrusion that is downstream from the junction that's formed by the primary channel and the protrusion.

Figure 24A:
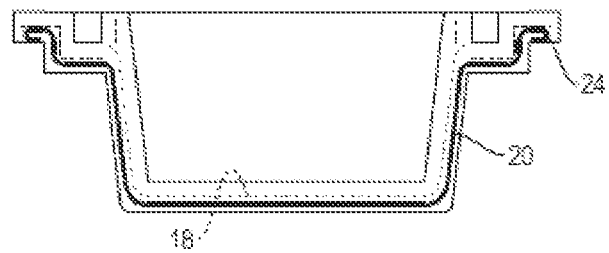
FIG. 24A is a cross-sectional view of a co-extrusion molded plastic article having a u-shaped symmetrical flange wherein the interior core stream is offset such that the combined radial distance of the resulting inner and outer layers consists of 20% of the outer layer and 80% of the inner layer.

FIGS. 23A and 24A provide a cross-sectional view of an exemplary embodiment of a mold cavity and the resulting fill as taught by the methods and systems disclosed herein. Those skilled in the art will appreciate that the proper fill of the mold cavity results in a molded plastic article having a like shape and geometry as depicted in FIGS. 23A and 24A. In this exemplary embodiment, the resultant plastic article is a cup-shaped article which comprises a body portion and a protrusion portion formed as a lip about the terminal portion of the open end of the body portion. The lip extends radially outward from the open end of the cup-shaped article to form a U-shaped protrusion with 23A having an extended lip at a portion of the circumference. The cup-shaped article comprises a skin having an inner layer formed from the inner stream and having an outer layer formed from the outer stream. Encompassed within the skin is an interior core formed from the interior core stream. In this embodiment, the skin polymeric material and the interior core stream polymeric material flow continuously in the primary channel of the mold cavity defining the body portion into a branch channel defining the protrusion portion and the leading edge of the interior core stream is place at or near the terminal end of the branch channel.

Figure 23B:
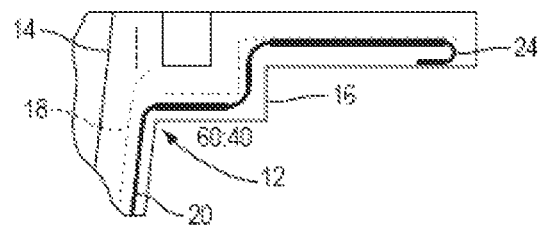
FIG. 23B is a cross-sectional view of a co-extrusion molded plastic article having an extended u-shaped flange wherein the interior core stream has a start time of $T_1$ and is offset such that the combined radial distance of the resulting inner and outer layers consists of 20% of the outer layer and 80% of the inner layer. The leading edge of the resulting interior core layer is communicated to a position that is substantially adjacent to the flow-front of the combined stream in the downstream branch channel and wraps around on itself.
Figure 24B:
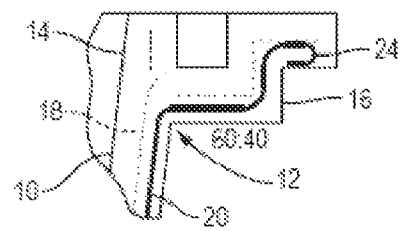
FIG. 24B is a cross-sectional view of a co-extrusion molded plastic article having a u-shaped flange wherein the interior core stream has a start time of $T_2$ and is offset such that the combined radial distance of the resulting inner and outer layers consists of 20% of the outer layer and 80% of the inner layer. The leading edge of the resulting interior core layer is communicated to a position that is substantially adjacent to the flow-front of the combined stream and wraps around on itself.

FIGS. 23B and 24B depict the resulting fill of the mold cavity when the extrusion start time of the interior core layer starts at time $T_1$ and the extrusion start time of the inner and outer layers starts at time $T_0$ and the inner to outer volumetric flow ratio is 80:20 entering the branch channel of the mold cavity. With a volumetric flow ratio of 80:20 the interior core stream is placed on the zero-velocity gradient of the combined velocity profile. As depicted in FIGS. 23B and 24B under these conditions the interior core stream does not break through the flow-front of the inner and outer layers before the mold cavity is filled. In fact, the interior core stream catches up to the flow-front and folds over on itself toward the outer layer. The extended u-shaped protrusion of FIGS. 23A-23B and the u-shaped protrusion of FIGS. 24A-24B depict an additional junction within the protrusion that is downstream from the junction that's formed by the primary channel and the protrusion.

Figure 25:
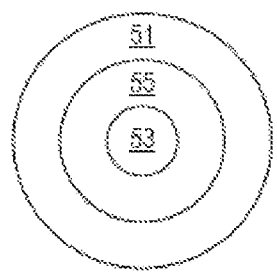
FIG. 25 depicts a cross-sectional view of the annular flow of the combined polymeric stream.

FIG. 25 illustrates the cross section A-A of FIG. 26 of the annular flow of the combined polymeric stream as it flows from the nozzle into the gate portion of the molding system. Interior core stream 55 is encased by inner stream 53 and outer stream 51.

FIG. 26 illustrates the injection of the combined polymeric stream from the nozzle into the mold cavity 130 to form the molded plastic article. The in nozzle 100 includes a throttle pin 110 for adjusting the volumetric flow rate of the inner and outer streams. The velocity profile 120 of the combined stream is fastest at streamline 150 and slower at streamlines 160. An interior core 170 is placed at a streamline having a velocity that is less than the velocity at the zero-velocity gradient 150 but greater than $V_{avg}$. The leading edge of the interior core stream 170 catches up to the flow-front 140 and folds on itself.

FIGS. 26A, 26B and 26C depict different temporal embodiments as the interior core 170 travels along the mold cavity 130 and eventually catches up to the flow-front and folds over on itself 171.

FIG. 27 illustrates an exemplary system suitable for practicing the present invention. Co-injection molding system 1000 is configured to inject at least two materials into a mold cavity. Materials suitable for use with the present invention include polymer based materials such as, Polyethylene Terephtholate (PET), Polypropylene (PP) ethylene vinyl alcohol (EVOH), and polycarbonates. Co-injection molding system 1000 includes a first material source 1200, a second material source 1400, and a manifold 1600. Co-injection molding system 1000 further includes nozzle assemblies 18A-18D and mold 2400. Mold 24 includes gates 20A-20D, and cavities 22A-22H A first polymeric material is extruded from the first material source 1200 and a second polymeric material is extruded from the second material source 1400 into the manifold 1600 for combining in nozzles 18A-18D before being injected into mold cavities 22A-22H. The first and second polymeric streams are combined to form a combined polymeric stream such that the first polymeric material forms an interior core stream in the combined polymeric stream while the second polymeric material forms the inner and outer streams in the combined stream. The inner and outer streams encase the interior core stream as the combined polymeric stream is injected from the nozzle.

Figure 28:
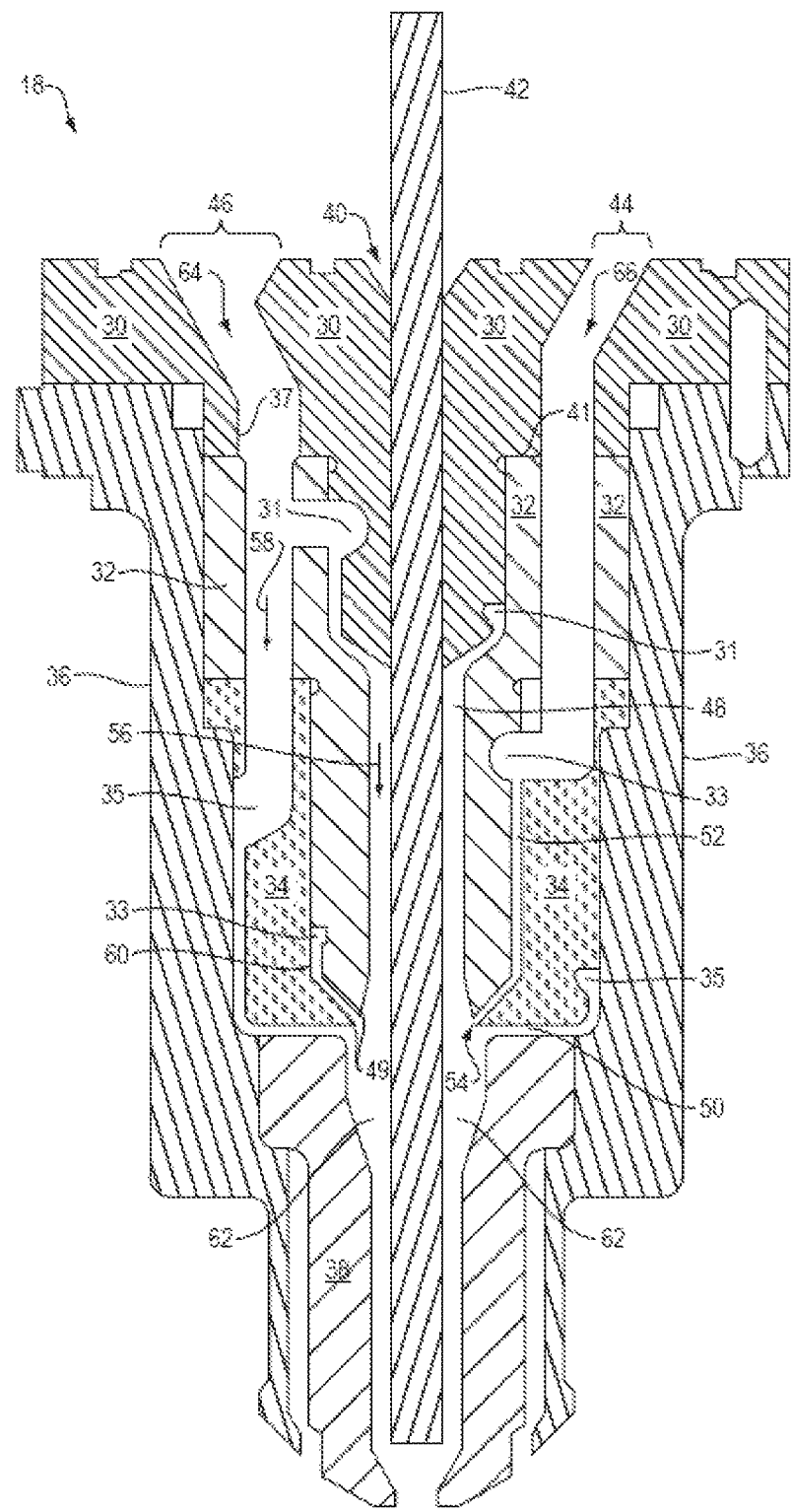
FIG. 28 is a cross-sectional view of a nozzle suitable for combining and injecting the polymeric streams used to form the plastic articles disclosed herein.

FIG. 28 illustrates an exemplary nozzle assembly suitable for practicing the present invention. Nozzle assembly 18 includes an inner combining means 30, a middle combining means 32, and an outer combining means 34. Nozzle assembly 18 further includes nozzle body 36 and nozzle tip 38. Inner combining means 30, middle combining means 32, outer combining means 34, nozzle body 36, and nozzle tip 38 cooperatively combine to form a number of conical, annular, and axial passages and channels in nozzle assembly 18. The nozzle assembly 18 is well suited for use in a co-injecting system, for example system 10, for forming a plastic object having two or more layers.

Inner combining means 30 includes a first inlet 46 to receive a first polymeric material 64, such as a skin material (i.e., inner and outer layer material), and a second inlet 44 to receive a second polymeric material 66, such as a core material (i.e., interior layer material). The inner combining means 30 further includes a through bore 40 configured to receive a valve pin 42. The through bore 40 extends through the middle combining means 32, and through a portion of the outer combining means 34 to allow the valve pin 42 to move in an axial direction along a longitudinal axis of the nozzle assembly 18. Through bore 40 has an inner wall diameter that varies along a central longitudinal axis of the nozzle assembly 18. Valve pin 42 is movable in an axial direction along the central longitudinal axis of nozzle assembly 18 to assist in controlling the flow of the first polymeric material 64 and second polymeric material 66 through nozzle assembly 18 and into mold 24.

Middle combining means 32 cooperatively engages with the inner combining means 30 form a portion of the plurality of annular flow channels in nozzle assembly 18. Middle combining means 32 receives from channel 37 the first polymeric material 64 and receives from channel 41 the second polymeric material 66 to manipulate the flow of each of the polymeric materials through a plurality of annular fluid carrying passages or channels. The flow manipulation carried out by middle combining means 32 initiates the creation of an outer material stream 58 and an inner material stream 56 that together encapsulate an interior material stream 60.

The middle combining means 32 when coupled with the inner combining means 30 forms a wrapped-coat-hanger die 31 that circumferentially extends around the through bore 40 and valve pin 42. Wrapped-coat-hanger die 31 provides annular fluid flow passage 48 with a uniform melt distribution of the first polymeric material 64. Annular fluid flow passage 48 channels an annular flow stream of the inner material stream 56 into stream combination area 54 through orifice 80. FIG. 7 illustrates orifice 80 with more detail.

Outer combining means 34 cooperatively engages with middle combining means 32 to form one or more fluid carrying passages or channels to manipulate the second polymeric material 66 forming an interior layer of the resulting plastic object. The outer combining means 34 when coupled with the middle combining means 32 forms a wrapped-coat-hanger die 33 that circumferentially extends around inner material stream 56, through bore 40, and valve pin 42. Wrapped-coat-hanger die 33 provides conical fluid flow passage 52 with a uniform melt distribution of the second polymeric material 66. Conical flow passage 52 feeds an annular stream of the second polymeric material 66 into stream combination area 54 through orifice 82. FIG. 7 illustrates orifice 82 with more detail.

The outer combining means 34 cooperatively engages with nozzle body 36. The outer combining means 34 when coupled with the nozzle body 36 forms wrapped-coat-hanger die 35 that circumferentially extends around the interior layer stream 52, the inner layer stream 56, the through bore 40, and the valve pin 42. Wrapped-coat-hanger die 35 provides radial fluid flow passage 50 with a uniform melt distribution of the first polymeric material 64. Radial fluid flow passage 50 feeds stream combination area 54 with a flow of first polymeric material 64 through orifice 84. The first polymeric material 64 fed into the stream combination area 54 through orifice 84 forms the outer layer of a resulting molded object.

Fluid flow passages 48, 50, and 52 feed stream combination area 54 with the outer material stream 58, the inner material stream 56, and the interior material stream 60. A portion of the nozzle tip 38, a portion of the outer combining means 34, a portion of the middle combining means 32, and a portion of the valve pin 42, in combination form the stream combination area 54. Stream combination area 54 has an inner passageway diameter of between about 6.7 mm and about 17.2 mm. Stream combination area 54 combines in a simultaneous or near simultaneous manner the outer material stream 58 received from the fluid flow passage 50, the inner material stream 56 received from the fluid flow passage 48, and the interior material stream 60 received from the fluid flow passage 52 to form annular output stream 49. Stream combination area 54 is discussed in more detail relative to FIGS. 7 and 8.

The channels, bores and passageways of the inner combining means 30, the middle combining means 32 and the outer combining means 34 and more specifically the channels, bores and passageways associated with the formation and the flow of inner and outer layer material in the nozzle assembly 18 may be sized, defined, adapted and configured to control or produce a desired volumetric flow ratio as discussed above. In this manner, the valve pin 42 may remain in a fixed position and does not need to be moved to control or form a particular volumetric flow ratio. In other words, the nozzle assembly 18 has a channel configuration and structure to output a desired or selected volumetric flow ratio without the need of an associated controller or microprocessor. In some exemplary embodiments, the valve pin 42 may be controlled by a controller or microprocessor to control the volumetric flow ratio.

The annular output stream 49 flows from the stream combination area 54 through fluid flow passage 62 to output portion 39 of nozzle assembly 18. Fluid flow passage 62 has an annular inner passage that radially extends about through bore 40 and axially extends from the stream combination area 54 to the output portion 39. The output portion 39 communicates with a gate of a mold, such as one of gates 20A-20D.

The annular output stream 49 formed by the stream combination area 54 has an outer annular skin layer and an inner annular skill) layer formed of the first polymeric material 64, and an interior or core annular layer formed of the second polymeric material 66. The inner and outer skin layers of the first polymeric material 64 each have a substantially like cross sectional area as the materials flow through the fluid flow passage 62 to the output portion 39. The inner and outer skin layers of the first polymeric material 64 encapsulate the interior layer of the second polymeric material 66, which forms a core portion of a resulting plastic object.

Upon injection from the nozzle assembly 18, the combined polymeric stream 49, as depicted in FIG. 25, comprises an interior core stream 55 that flows along concentric or annular streamlines between the inner 53 and outer 51 polymeric streams.

FIG. 29 illustrates an exemplary computing environment suitable for practicing exemplary embodiments taught herein. The environment may include a co-injection control device 900 coupled, wired, wirelessly or a hybrid of wired and wirelessly, to co-injection system 1000. The con-injection control device 900 is programmable to implement executable Flow Control Code 950. Co-injection control device 900 includes one or more computer-readable media for storing one or more computer-executable instructions or software for implementing exemplary embodiments. The computer-readable media may include, but are not limited to, one or more types of hardware memory, non-transitory tangible media, etc. For example, memory 906 included in the co-injection control device 900 may store computer-executable instructions or software, e.g., instructions for implementing and processing every module of the executable Flow Control Code 950. Co-injection control device 900 also includes processor 902 and, one or more processor(s) 902' for executing software stored in the memory 906, and other programs for controlling system hardware. Processor 902 and processor(s) 902' each can be a single core processor or multiple core (904 and 904') processor.

Virtualization may be employed in co-injection control device 900 so that infrastructure and resources in the computing device can be shared dynamically. Virtualized processors may also be used with the executable Flow Control Code 950 and other software in storage 916. A virtual machine 914 may be provided to handle a process running on multiple processors so that the process appears to be using only one computing resource rather than multiple. Multiple virtual machines can also be used with one processor.

Memory 906 may comprise a computer system memory or random access memory, such as DRAM, SRAM, EDO RAM, and the like. Memory 906 may comprise other types of memory as well, or combinations thereof.

A user may interact with co-injection control device 900 through a visual display device 922, such as a computer monitor, which may display the user interfaces 924 or any other interface. The visual display device 922 may also display other aspects or elements of exemplary embodiments, e.g. the databases, the enrollment forms, the medication guide, etc. Co-injection control device 900 may include other I/O devices such a keyboard or a multi-point touch interface 908 and a pointing device 910, for example a mouse, for receiving input from a user. The keyboard 908 and the pointing device 910 may be connected to the visual display device 922. Co-injection control device 900 may include other suitable conventional I/O peripherals. Co-injection control device 900 may further comprise a storage device 916, such as a hard-drive, CD-ROM, or other non-transitory computer readable media, for storing an operating system 918 and other related software, and for storing executable Flow Control Code 950.

Co-injection control device 900 may include a network interface 912 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, controller area network (CAN), or some combination of any or all of the above. The network interface 912 may comprise a built-in network adapter, network interface card, PCMCIA network card, card bus network adapter, wireless network adapter, USB network adapter, modem or any other device suitable for interfacing authorization computing device 900 to any type of network capable of communication and performing the operations described herein. Moreover, co-injection control device 900 may be any computer system such as a workstation, desktop computer, server, laptop, handheld computer or other form of computing or telecommunications device that is capable of communication and that has sufficient processor power and memory capacity to perform the operations described herein.

Co-injection control device 900 can be running any operating system such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. The operating system may be running in native mode or emulated mode.

Flow Control Code 950 includes executable code executable by the processor 902 to control the co-injection system 1000 to selectively control a volumetric flow volume of the inner and outer polymeric streams, control a position of the interior core stream relative to a velocity flow front of the combined polymeric stream and control extrusion start time of the interior core stream relative to the extrusion start time of the inner and outer polymeric streams as taught herein. That is, Flow Control Code 950 includes executable code executable by the processor 902 to control the co-injection system 1000 to selectively direct the leading edge of the interior core stream into a downstream branch channel branching from a branch junction in a mold cavity. Execution of the Flow Control Code 950 by the processor 902 allows the co-injection system 1000 to advance the interior core stream close as possible to the terminal end of the branch channel without allowing the flow-front of the interior core stream to breakthrough the inner and outer streams. Methods and co-injection systems taught herein facilitate the co-injection molding of food or beverage containers whereby the interior core stream breakthrough is prevented or avoided by controlling the position, timing and volumetric flow rates of the various polymeric flow streams. In some exemplary embodiments, the Flow Control Code 950 is executed to control the extrusion start and stop times of the extruders 1200 and 1400. In some exemplary embodiments, the Flow Control Code 950 is executed to control the extrusion start and stop times of the extruders 1200 and 1400 and control a position of a valve pin, for example, valve pin 42. In some exemplary embodiments, the Flow Control Code 950 is executed to control the extrusion start and stop times of the extruders 1200 and 1400 and the volumetric flow ratio is defined by the bores, channels and passageways of an exemplary valve assembly, for example, the valve assembly 18.

By these exemplary embodiments, novel methods and systems are provided herein for the production of molded polymeric plastic articles such as Jell-O® cups, yogurt cups, fruit cups and similar containers having (1) a body portion which has a closed base, side walls coupled to the base and an open terminal end, and (2) a protrusion or flange portion extending radially outward or inward at or near the open end. By these embodiments, an interior layer, which may function as a barrier layer, is selectively communicated to a desired location in a flanged portion or other terminal portion of the polymeric plastic article(s). In controlling the streamline position of the interior core as it is forced along the pathways of the nozzle and mold cavity, it is possible to control the streamline position of the interior core as it travels along the body forming portion and the flange forming portion of the mold cavity. Specific offsets of the interior core as it travels along the flange position are possible by adjusting the upstream streamline position of the interior core flow stream. Likewise, by the exemplary embodiments provided herein, methods are provided wherein the leading edge of the interior core flow stream can be controlled such that it is communicated to a desired end point location in the flange portion or other terminal portion without breaking through the flow-front of the combined stream which forms the flange portion or the terminal portion.

Equivalents

Those skilled in the art will recognize, or be able to ascertain using no more than routine experimentation, many equivalents to the specific embodiments of the invention described herein. Such equivalents are intended to be encompassed by the following claims.

What is claimed is:

1. A method of co-extruding a plurality of polymeric plastic material streams to produce a resulting molded plastic article having a body portion and a protrusion portion, the method comprising the steps of:
    forming a combined polymeric flow stream comprising an inner stream of a first polymeric material and an outer stream of the first polymeric material forming an innermost surface and an outermost surface, respectively, of the resulting molded plastic article and an interior core stream of a second polymeric material defining an interior layer of the resulting molded plastic article;
    controlling the inner stream and the outer stream to selectively control the flow of the interior core stream through a branch junction formed at an intersection of an upstream primary channel and a downstream branch channel in a mold cavity downstream from a gate portion of the mold cavity; and
    maintaining a first volumetric flow ratio of the inner stream to the outer stream of the first polymeric material in the primary channel throughout flow of the combined polymeric flow stream into the mold cavity.

2. The method of claim 1, wherein the step of controlling the inner stream and the outer stream to selectively control the flow of the interior core stream through the branch junction comprises controlling the first volumetric flow ratio of the inner stream to the outer stream of the first polymeric material in the primary channel.

3. The method of claim 1, wherein the interior core stream selectively flows through the branch junction into the downstream branch channel.

4. The method of claim 1, wherein the interior core stream selectively flows through the branch junction past the downstream branch channel.

5. The method of claim 3, further comprising the step of controlling a leading edge of the interior core stream to cause the leading edge to flow to, or near, a terminal end of the branch channel.

6. The method of claim 5, wherein the step of controlling a leading edge of the interior core stream prevents the leading edge of the interior core stream from breaking through a flow front formed by the inner stream and the outer stream.

7. The method of claim 5, wherein the leading edge of the interior core stream halts near, or at, the terminal end of the branch channel.

8. The method of claim 5, wherein the leading edge of the interior core stream is wrapped around itself either toward the inner stream, or toward the outer stream at or near the terminal end of the branch channel.

9. The method of claim 5, wherein the step of controlling a leading edge of the interior core stream to cause the leading edge to flow to, or near, a terminal end of the branch channel comprises controlling an extrusion start time of the interior core stream relative to an extrusion start time of the inner stream and the outer stream.

10. The method of claim 9, wherein the extrusion start time of the interior stream occurs subsequent to the extrusion start time of the inner stream and the outer stream.

11. The method of claim 1, wherein the molded plastic article comprises a container with a closed end coupled to a cylindrical side wall defining an open end opposite the closed end and a protrusion portion radially protruding from the side wall, the protrusion portion including an interior layer formed of the second polymeric material that extends into a distal portion of the protrusion portion.

12. The method of claim 11, wherein the first polymeric material of the inner stream and outer stream encases the interior layer of the second polymeric material at the distal portion of the protrusion portion.

13. The method of claim 11, wherein the protrusion portion comprises any of a lip, a flange and another cylindrical wall.

14. The method of claim 11, wherein the protrusion portion extends circumferentially around the cylindrical side wall and has a symmetric shape.

15. The method of claim 11, wherein the protrusion portion extends circumferentially around the cylindrical side wall and has an asymmetric shape.

16. The method of claim 3, further comprising controlling a second volumetric flow ratio of the inner stream to the outer stream of the first polymeric material in the branch channel through control of the first volumetric flow ratio, wherein the second volumetric flow ratio is different than the first volumetric flow ratio.

17. The method of claim 1, wherein controlling the inner stream and the outer stream to selectively control the flow of the interior core stream through the branch junction positions the interior stream on a flow line away from the zero-gradient of velocity flowline downstream of the branch junction.

* * * * *